US009821535B2

(12) United States Patent
Shimamoto et al.

(10) Patent No.: US 9,821,535 B2
(45) Date of Patent: Nov. 21, 2017

(54) INTERLAYER FOR LAMINATED GLASS, AND LAMINATED GLASS

(71) Applicants: SEKISUI CHEMICAL CO., LTD., Osaka, Osaka (JP); DENKI KAGAKU KOGYO KABUSHIKI KAISHA, Chuo-ku, Tokyo (JP)

(72) Inventors: Michio Shimamoto, Kouka (JP); Tatsuya Iwamoto, Kouka (JP); Ryousuke Komatsu, Kouka (JP); Shougo Yoshida, Kouka (JP); Nobuyuki Tanno, Itoigawa (JP); Takao Hashimoto, Itoigawa (JP); Hirohisa Otake, Itoigawa (JP)

(73) Assignees: SEKISUI CHEMICAL CO., LTD., Osaka (JP); DENKI KAGAKU KOGYO KABUSHIKI KAISHA, Tokyo (JP)

( * ) Notice: Subject to any disclaimer, the term of this patent is extended or adjusted under 35 U.S.C. 154(b) by 150 days.

(21) Appl. No.: 14/439,647

(22) PCT Filed: Oct. 31, 2013

(86) PCT No.: PCT/JP2013/079611
§ 371 (c)(1),
(2) Date: Apr. 29, 2015

(87) PCT Pub. No.: WO2014/069593
PCT Pub. Date: May 8, 2014

(65) Prior Publication Data
US 2015/0258751 A1 Sep. 17, 2015

(30) Foreign Application Priority Data
Oct. 31, 2012 (JP) ................................ 2012-240998

(51) Int. Cl.
| *B32B 17/10* | (2006.01) |
| *B60J 1/00* | (2006.01) |
| *B60J 1/02* | (2006.01) |
| *C08K 5/103* | (2006.01) |
| *B32B 27/22* | (2006.01) |
| *B32B 27/30* | (2006.01) |

(52) U.S. Cl.
CPC .. *B32B 17/10036* (2013.01); *B32B 17/10605* (2013.01); *B32B 17/10761* (2013.01); *B32B 27/22* (2013.01); *B32B 27/306* (2013.01); *B60J 1/001* (2013.01); *B60J 1/02* (2013.01); *C08K 5/103* (2013.01); *B32B 2250/03* (2013.01); *B32B 2250/40* (2013.01); *B32B 2307/102* (2013.01); *B32B 2307/412* (2013.01); *B32B 2419/00* (2013.01); *B32B 2605/00* (2013.01); *Y10T 428/3163* (2015.04); *Y10T 428/31859* (2015.04)

(58) Field of Classification Search
CPC .................................................. B32B 17/10036
USPC ....................................................... 428/437
See application file for complete search history.

(56) References Cited

U.S. PATENT DOCUMENTS

| 3,446,767 | A | 5/1969 | Nolan | |
| 3,519,587 | A * | 7/1970 | Wiest | C09J 7/021 524/275 |
| 3,952,135 | A * | 4/1976 | Priddle | B32B 17/10036 428/441 |
| 4,382,996 | A | 5/1983 | Mori et al. | |
| 7,078,455 | B2 * | 7/2006 | Heldmann | C08J 3/005 523/201 |
| 2009/0305058 | A1 | 12/2009 | Marumoto | |
| 2010/0028642 | A1 * | 2/2010 | Steuer | B32B 17/10761 428/220 |
| 2010/0167610 | A1 | 7/2010 | McLennan et al. | |
| 2010/0227995 | A1 | 9/2010 | Kohler | |
| 2013/0273378 | A1 * | 10/2013 | Iwamoto | B32B 17/10761 428/436 |

FOREIGN PATENT DOCUMENTS

| CN | 101426746 A | 5/2009 |
| CN | 101824290 A | 9/2010 |

(Continued)

OTHER PUBLICATIONS

Supplementary European Search Report for the Application No. EP 13 85 1941 dated Jun. 16, 2016.

(Continued)

*Primary Examiner* — Doris Lee
(74) *Attorney, Agent, or Firm* — Cheng Law Group, PLLC

(57) ABSTRACT

There is provided an interlayer film for laminated glass which is capable of enhancing sound insulating properties in the laminated glass obtained in the case of being used for constituting the laminated glass, and laminated glass prepared using the interlayer film for laminated glass. An interlayer film for laminated glass according to the present invention includes a modified polyvinyl acetate and a plasticizer, and the modified polyvinyl acetate has a vinyl acetate structural unit and a fatty acid vinyl ester structural unit; the laminated glass according to the present invention includes a first laminated glass constituent member, a second laminated glass constituent member, and an interlayer film sandwiched between the first and second laminated glass constituent members, and in the laminated glass according to the present invention, the interlayer film is the interlayer film for laminated glass described above.

19 Claims, 2 Drawing Sheets

(56) References Cited

FOREIGN PATENT DOCUMENTS

| JP | 62-100463 A | 5/1987 |
| JP | 5-32434 A | 2/1993 |
| JP | 1-255827 A | 9/1999 |
| JP | 2007-70200 A | 3/2007 |

OTHER PUBLICATIONS

Written Opinion of the International Searching Authority (PCT/ISA/237) for Application No. PCT/JP2013/079611 dated Nov. 26, 2013 (English Translation mailed May 14, 2015).
International Search Report for he Application No. PCT/JP2013/079611 dated Nov. 26, 2013.
Written Opinion of the International Searching Authority (PCT/ISA/237) for Application No. PCT/JP2013/079611 dated Nov. 26, 2013.
The First Office Action for the Application No. 201380057044.1 from The State Intellectual Property Office of the People's Republic of China dated Nov. 1, 2016.

* cited by examiner

[FIG. 1]
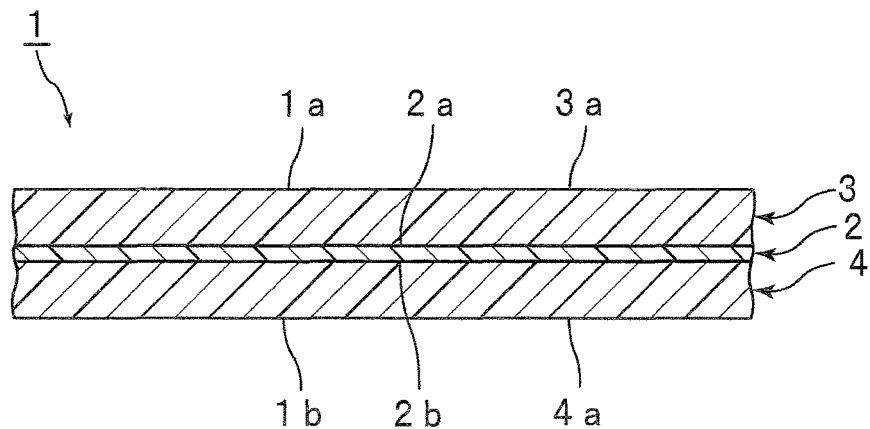
[FIG. 2]
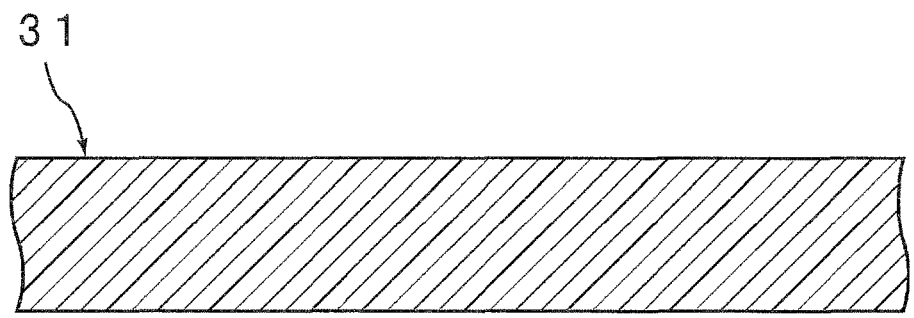
[FIG. 3]
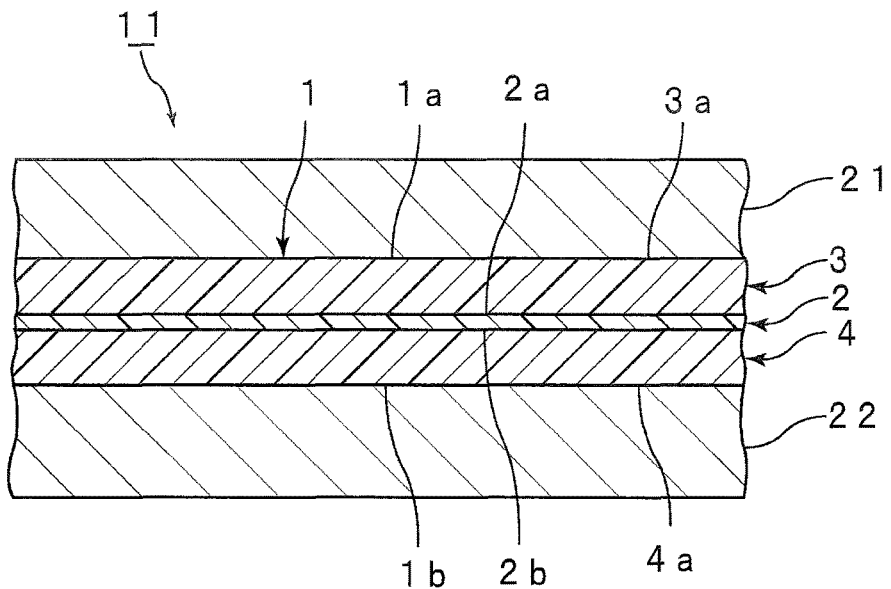

[FIG. 4]
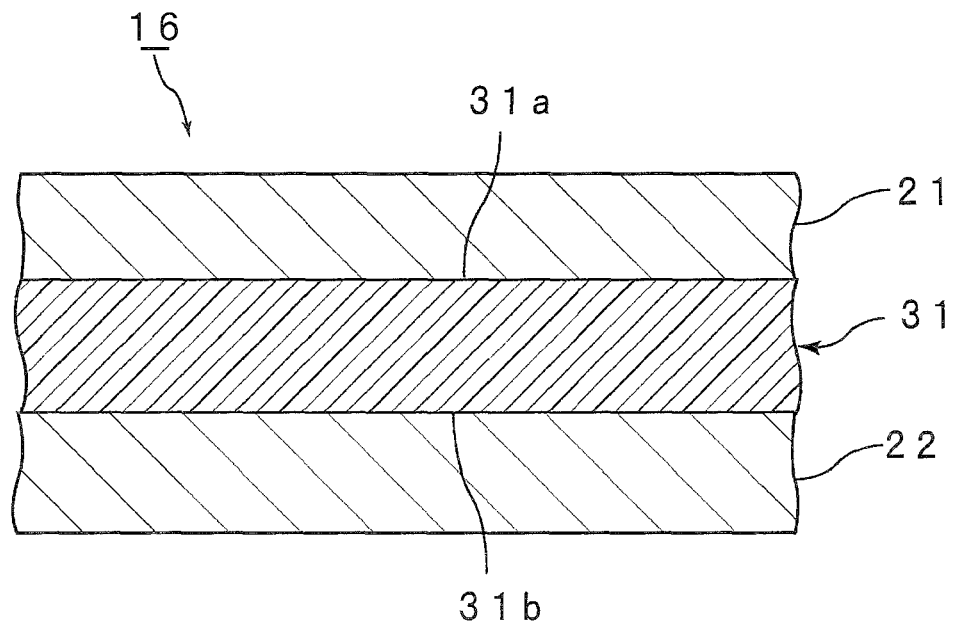

INTERLAYER FOR LAMINATED GLASS, AND LAMINATED GLASS

TECHNICAL FIELD

The present invention relates to an interlayer film for laminated glass used for laminated glass of automobiles, buildings and the like. The present invention also relates to laminated glass prepared using the interlayer film for laminated glass.

BACKGROUND ART

Since laminated glass generates only a small amount of scattering glass fragments even when subjected to external impact and broken, it is excellent in safety. As such, the laminated glass is widely used for automobiles, railway vehicles, aircraft, ships, buildings and the like. The laminated glass is produced by sandwiching an interlayer film between a pair of glass plates.

In recent years, for the purpose of attaining reduced weight of laminated glass, a technique of thinning the laminated glass has been studied. However, when the laminated glass is thinned, the sound insulating properties are lowered. In the case of using laminated glass low in sound insulating properties for a windshield of an automobile, or the like, there is a problem that sufficient sound insulating properties are not attained against the sound in a sound area of 5000 Hz or so such as wind noises and driving sounds of a wiper device.

Accordingly, a technique of enhancing the sound insulating properties of laminated glass by modifications of materials for the interlayer film has been studied.

As an example of an interlayer film for laminated glass, the following Patent Document 1 discloses a sound insulating layer containing 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and more than 30 parts by weight of a plasticizer. This sound insulating layer can be used alone as a single-layered interlayer film or can be layered on other layer(s) to be used as a multi-layered interlayer film.

RELATED ART DOCUMENT

Patent Document

Patent Document 1: JP 2007-070200 A

SUMMARY OF THE INVENTION

Problems to be Solved by the Invention

In the laminated glass prepared using the interlayer film described in the foregoing Patent Document 1, the sound insulating properties can be enhanced to some extent, but there has been a demand for further enhancing the sound insulating properties.

Moreover, in recent years, fueled vehicles employing an internal combustion engine have been shifting to electric vehicles employing an electric motor, hybrid electric vehicles employing an internal combustion engine and an electric motor, and the like. In the laminated glass used for a fueled vehicle employing an internal combustion engine, the sound insulating properties in a relatively low frequency area are especially required. However, even in the laminated glass used for a fueled vehicle employing an internal combustion engine, it is desirable that the sound insulating properties in a high frequency area be high. In contrast, in the laminated glass used for an electric vehicle utilizing an electric motor and a hybrid electric vehicle, high sound insulating properties in a high frequency area are especially required for effectively cutting off driving sounds of an electric motor.

In the case of using the interlayer film described in the foregoing Patent Document 1 to constitute laminated glass, the sound insulating properties in a high frequency area of the laminated glass are insufficient, and thus, there are cases where the lowering in sound insulating properties caused by a coincidence effect cannot be avoided. In particular, there are cases where the sound insulating properties at around 20° C. of the laminated glass are insufficient.

In this context, a coincidence effect refers to a phenomenon in which, when a sound wave is made incident into a glass plate, a transverse wave is propagated on the glass surface due to the rigidity and inertia of the glass plate, the transverse wave and the incident sound are resonant with each other, and as a result, the transmission of sound occurs.

Moreover, in recent years, for the purpose of enhancing the sound insulating properties of laminated glass, a technique of adding an excess amount of a plasticizer to an interlayer film has also been studied. The sound insulating properties of laminated glass can be improved by adding an excess amount of a plasticizer to an interlayer film. However, in the case of using an excess amount of a plasticizer, the plasticizer may bleed out to the surface of the interlayer film.

Moreover, since laminated glass is used outside, an interlayer film is sometimes exposed to an alkali condition. When a conventional interlayer film is exposed to an alkali condition, the interlayer film is sometimes changed in its quality and deteriorated. On that account, it is preferred that the performance of preventing an interlayer film from being changed in its quality and deteriorated even when it is exposed to an alkali condition (hereinafter, referred to also as the alkali resistance) be enhanced.

An object of the present invention is to provide an interlayer film for laminated glass which is capable of enhancing the sound insulating properties in the laminated glass obtained in the case of being used for constituting the laminated glass, and laminated glass prepared using the interlayer film for laminated glass.

An object of the present invention with limitation is to provide an interlayer film for laminated glass which is capable of enhancing the sound insulating properties in a high frequency area in the laminated glass obtained in the case of being used for constituting the laminated glass, and laminated glass prepared using the interlayer film for laminated glass.

An object of the present invention with limitation is to provide an interlayer film for laminated glass which is capable of enhancing the alkali resistance of the interlayer film, and laminated glass prepared using the interlayer film for laminated glass.

Means for Solving the Problems

According to a broad aspect of the present invention, there is provided an interlayer film for laminated glass including a modified polyvinyl acetate and a plasticizer; and the modified polyvinyl acetate having a vinyl acetate structural unit and a fatty acid vinyl ester structural unit.

In a specific aspect of the interlayer film for laminated glass according to the present invention, the modified polyvinyl acetate preferably contains the vinyl acetate structural unit in a content greater than or equal to 45% by mole and the fatty acid vinyl ester in a content less than or equal to 55% by mole, and more preferably contains the vinyl acetate structural unit in a content greater than or equal to 50% by mole and the fatty acid vinyl ester structural unit in a content less than or equal to 50% by mole, in 100% by mole of the total of the vinyl acetate structural unit and the fatty acid vinyl ester structural unit.

In a specific aspect of the interlayer film for laminated glass according to the present invention, the fatty acid vinyl ester structural unit is a structural unit derived from a fatty acid vinyl ester and introduced by the fatty acid vinyl ester, the number of carbon atoms of the fatty acid vinyl ester is preferably less than or equal to 20, and the number of carbon atoms of the fatty acid vinyl ester is more preferably greater than or equal to 5 and less than or equal to 20.

In a specific aspect of the interlayer film for laminated glass according to the present invention, the fatty acid vinyl ester is vinyl caprylate, vinyl caprate, vinyl laurate, vinyl myristate, vinyl palmitate, vinyl stearate, vinyl cinnamate or vinyl neodecanoate.

In a specific aspect of the interlayer film for laminated glass according to the present invention, the modified polyvinyl acetate has the vinyl acetate structural unit, the fatty acid vinyl ester structural unit and a structural unit derived from a monomer having a carboxyl group.

In a specific aspect of the interlayer film for laminated glass according to the present invention, the monomer having a carboxyl group is (meth)acrylic acid, maleic acid, fumaric acid, crotonic acid, itaconic acid, a monoester of maleic acid, a monoester of fumaric acid or a monoester of itaconic acid.

In a specific aspect of the interlayer film for laminated glass according to the present invention, the modified polyvinyl acetate contains the vinyl acetate structural unit in a content greater than or equal to 45% by mole and less than or equal to 98.99% by mole, the fatty acid vinyl ester structural unit in a content greater than or equal to 1% by mole and less than or equal to 50% by mole, and the structural unit derived from a monomer having a carboxyl group in a content greater than or equal to 0.01% by mole and less than or equal to 5% by mole, in 100% by mole of the total of the vinyl acetate structural unit, the fatty acid vinyl ester structural unit and the structural unit derived from a monomer having a carboxyl group.

In a specific aspect of the interlayer film for laminated glass according to the present invention, the modified polyvinyl acetate is obtained by allowing vinyl acetate and a fatty acid vinyl ester to undergo copolymerization in the presence of a compound having a structural unit represented by the following formula (X):

[Chemical 1]

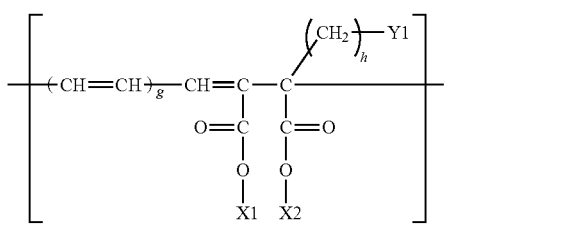

Formula (X)

wherein X1 and X2 each represent an alkyl group with 1 to 12 carbon atoms, a hydrogen atom or a metal salt, Y1 represents a carboxylic acid group, a carboxylic acid ester group, a carboxylic acid metal salt or a hydrogen atom, g represents an integer of 0 to 3, and h represents an integer of 0 to 12.

In a specific aspect of the interlayer film for laminated glass according to the present invention, the modified polyvinyl acetate is obtained by allowing vinyl acetate in a content greater than or equal to 45% by mole and a fatty acid vinyl ester in a content less than or equal to 55% by mole, in 100% by mole of the total of the vinyl acetate and the fatty acid vinyl ester, to undergo copolymerization in the presence of a compound having a structural unit represented by the formula (X).

In a specific aspect of the interlayer film for laminated glass according to the present invention, the modified polyvinyl acetate is obtained by allowing the vinyl acetate in a content greater than or equal to 45% by mole and less than or equal to 98.99% by mole, the fatty acid vinyl ester in a content greater than or equal to 1% by mole and less than or equal to 50% by mole, and the monomer having a carboxyl group in a content greater than or equal to 0.01% by mole and less than or equal to 5% by mole, in 100% by mole of the total of the vinyl acetate, the fatty acid vinyl ester and the monomer having a carboxyl group, to undergo copolymerization in the presence of a compound having a structural unit represented by the formula (X);

In a specific aspect of the interlayer film for laminated glass according to the present invention, the polymerization degree of the modified polyvinyl acetate is greater than or equal to 1000 and less than or equal to 9000.

In a specific aspect of the interlayer film for laminated glass according to the present invention, the interlayer film for laminated glass has a one-layer structure provided with only a first layer or a two or more-layered structure provided with the first layer and other layer(s), and the first layer includes the modified polyvinyl acetate and the plasticizer.

In a specific aspect of the interlayer film for laminated glass according to the present invention, the interlayer film for laminated glass is provided with a first layer and a second layer layered on a first surface of the first layer, and the first layer includes the modified polyvinyl acetate and the plasticizer.

In a specific aspect of the interlayer film for laminated glass according to the present invention, the second layer includes a polyvinyl acetal resin, and the acetylation degree of the polyvinyl acetal resin in the second layer is less than or equal to 15% by mole and the content ratio of hydroxyl groups therein is greater than or equal to 20% by mole.

In a specific aspect of the interlayer film for laminated glass according to the present invention, the interlayer film for laminated glass is further provided with a third layer layered on a second surface opposite to the first surface of the first layer.

In a specific aspect of the interlayer film for laminated glass according to the present invention, the third layer includes a polyvinyl acetal resin, and the acetylation degree of the polyvinyl acetal resin in the third layer is less than or equal to 15% by mole and the content ratio of hydroxyl groups therein is greater than or equal to 20% by mole.

The laminated glass according to the present invention includes a first laminated glass constituent member, a second laminated glass constituent member, and an interlayer film for laminated glass described above; and the interlayer film for laminated glass being sandwiched between the first and second laminated glass constituent members.

Effect of the Invention

Since the interlayer film for laminated glass according to the present invention includes a modified polyvinyl acetate and a plasticizer, and furthermore, the modified polyvinyl acetate has a vinyl acetate structural unit and a fatty acid vinyl ester structural unit, it is possible to enhance the sound insulating properties of laminated glass prepared using the interlayer film for laminated glass according to the present invention.

BRIEF DESCRIPTION OF DRAWINGS

FIG. 1 is a partially cutout cross-sectional view schematically showing the interlayer film for laminated glass in accordance with a first embodiment of the present invention.

FIG. 2 is a partially cutout cross-sectional view schematically showing the interlayer film for laminated glass in accordance with a second embodiment of the present invention.

FIG. 3 is a partially cutout cross-sectional view schematically showing an example of the laminated glass prepared using the interlayer film for laminated glass shown in FIG. 1.

FIG. 4 is a partially cutout cross-sectional view schematically showing an example of the laminated glass prepared using the interlayer film for laminated glass shown in FIG. 2.

MODES FOR CARRYING OUT THE INVENTION

Hereinafter, the details of the present invention will be described.

The interlayer film for laminated glass according to the present invention includes a modified polyvinyl acetate and a plasticizer. In the interlayer film for laminated glass according to the present invention, the modified polyvinyl acetate has a vinyl acetate structural unit and a fatty acid vinyl ester structural unit.

Since the interlayer film for laminated glass according to the present invention includes the specific modified polyvinyl acetate and a plasticizer, it is possible to enhance the sound insulating properties of laminated glass prepared using the interlayer film. Furthermore, it is also possible to enhance the sound insulating properties in a high frequency area of laminated glass prepared using the interlayer film. In particular, it is possible to effectively enhance the sound insulating properties in a high frequency area greater than 3 kHz.

Furthermore, as compared to conventionally used polyvinyl acetate or a modified product of the polyvinyl acetate other than the above-mentioned modified polyvinyl acetate, the alkali resistance of the above-mentioned modified polyvinyl acetate is high. As such, it is possible to enhance the alkali resistance of an interlayer film including the above-mentioned modified polyvinyl acetate. When the alkali resistance of an interlayer film is high, even when laminated glass provided with the interlayer film is used outside or the like, the interlayer film is hardly changed in its quality and hardly deteriorated.

It is preferred that the modified polyvinyl acetate be obtained by allowing vinyl acetate and a fatty acid vinyl ester to undergo copolymerization in the presence of a compound having a structural unit represented by the following formula (X). In this case, in the copolymerization, as necessary, a monomer having a carboxyl group described below may be further used.

[Chemical 2]

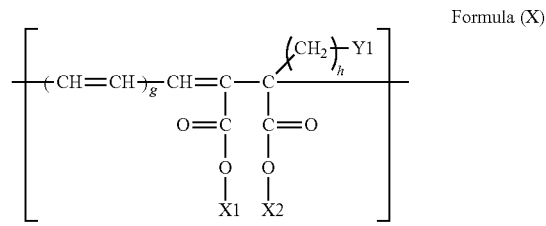

Formula (X)

In the foregoing formula (X), X1 and X2 each represent an alkyl group with 1 to 12 carbon atoms, a hydrogen atom or a metal salt, Y1 represents a carboxylic acid group, a carboxylic acid ester group, a carboxylic acid metal salt or a hydrogen atom, g represents an integer of 0 to 3, and h represents an integer of 0 to 12.

As compared to conventionally used polyvinyl acetate or a modified product of the polyvinyl acetate other than the above-mentioned modified polyvinyl acetate, particles of a modified polyvinyl acetate obtained by allowing vinyl acetate and a fatty acid vinyl ester to undergo copolymerization in the presence of a compound having a structural unit represented by the formula (X) have a small CV value and a narrow particle distribution. As such, by using the above-mentioned modified polyvinyl acetate, it is possible to enhance the homogeneity of the resulting interlayer film. Depending on places of the interlayer film, the nature thereof hardly varies, and the variation in nature among plural interlayer films is hardly generated.

In this connection, the modified polyvinyl acetate and the plasticizer need only to be contained in an area of at least a part of the interlayer film. With regard to the interlayer film, in the area where the modified polyvinyl acetate and the plasticizer are contained, it is possible to enhance the sound insulating properties and the alkali resistance.

The interlayer film for laminated glass according to the present invention may be an interlayer film for laminated glass having a one-layer structure provided with only a first layer or a two or more-layered structure provided with the first layer and other layer(s). In this case, the first layer includes the modified polyvinyl acetate and the plasticizer.

Hereinafter, the present invention will be elucidated by describing specific embodiments and examples of the present invention with reference to the drawings.

FIG. 1 shows an interlayer film for laminated glass in accordance with the first embodiment of the present invention schematically illustrated as a partially cutout cross-sectional view.

The interlayer film 1 shown in FIG. 1 is an interlayer film for laminated glass having a three-layered structure. The interlayer film 1 is provided with a first layer 2, a second layer 3 layered on the first surface 2a side of the first layer 2, and a third layer 4 layered on the second surface 2b side of the first layer 2.

Between the first layer 2 and the second layer 3 and between the first layer 2 and the third layer 4, other layers may be interposed, respectively. Examples of the other layers include a layer including a thermoplastic resin such as a polyvinyl acetal resin and a layer including polyethylene terephthalate or the like.

The interlayer film 1 includes the modified polyvinyl acetate and the plasticizer. In the interlayer film 1, it is preferred that the first layer 2 include the modified polyvinyl acetate and the plasticizer. In the case where the first layer 2 includes the modified polyvinyl acetate and the plasticizer, the second layer 3 and the third layer 4 each may or may not include the modified polyvinyl acetate and the plasticizer.

The first layer 2 is an intermediate layer. In the case where the first layer 2 includes the modified polyvinyl acetate and the plasticizer, the first layer 2 functions mainly as a sound insulating layer. The second layer 3 and the third layer 4 are protective layers and are surface layers in the present embodiment. The first layer 2 is sandwiched between the second layer 3 and the third layer 4. Accordingly, the interlayer film 1 has a multilayer structure in which the second layer 3, the first layer 2, and the third layer 4 are layered in this order.

The second layer 3 and the third layer 4 may be the same as or different from each other in composition. When the second layer 3 and the third layer 4 include a polyvinyl acetal resin, the adhesive force between each of the second layer 3 and the third layer 4 and the laminated glass constituent member is sufficiently enhanced. Furthermore, the penetration resistance of laminated glass prepared using the interlayer film is further enhanced and the handling properties of the interlayer film are also enhanced.

The interlayer film may be an interlayer film in which the second layer 3 is layered only on the first surface 2a side of the first layer 2 and the third layer 4 is not layered on the second surface 2b side of the first layer 2.

FIG. 2 shows an interlayer film for laminated glass in accordance with the second embodiment of the present invention schematically illustrated as a partially cutout cross-sectional view.

The interlayer film 31 shown in FIG. 2 is an interlayer film for laminated glass having a structure composed only of a first layer. The interlayer film 31 includes the modified polyvinyl acetate and the plasticizer.

Hereinafter, the details of the interlayer film for laminated glass according to the present invention, the details of each ingredient contained in the interlayer film, the details of the first, second and third layers constituting the interlayer film for laminated glass according to the present invention, and the details of each ingredient contained in the first, second and third layers will be described.

(Thermoplastic Resin)

The interlayer film for laminated glass includes a modified polyvinyl acetate. It is preferred that the first layer include a modified polyvinyl acetate. The modified polyvinyl acetate is a thermoplastic resin. One kind of the modified polyvinyl acetate may be used alone, and two or more kinds thereof may be combinedly used.

The modified polyvinyl acetate has a vinyl acetate structural unit and a fatty acid vinyl ester structural unit. The vinyl acetate structural unit is a structural unit derived from vinyl acetate and introduced by vinyl acetate. The fatty acid vinyl ester structural unit is a structural unit derived from a fatty acid vinyl ester and introduced by the fatty acid vinyl ester. The fatty acid vinyl ester is different from vinyl acetate. The modified polyvinyl acetate is obtained by allowing a polymerizable composition containing vinyl acetate and a fatty acid vinyl ester to undergo polymerization.

It is preferred that the modified polyvinyl acetate contain the vinyl acetate structural unit in a content greater than or equal to 10% by mole and the fatty acid vinyl ester in a content less than or equal to 90% by mole, in 100% by mole of the total of the vinyl acetate structural unit and the fatty acid vinyl ester structural unit. From the viewpoint of obtaining a modified polyvinyl acetate further excellent in alkali resistance, in 100% by mole of the total of the vinyl acetate structural unit and the fatty acid vinyl ester structural unit, it is preferred that the modified polyvinyl acetate contain the vinyl acetate structural unit in a content greater than or equal to 45% by mole and the fatty acid vinyl ester structural unit in a content less than or equal to 55% by mole, it is more preferred that the modified polyvinyl acetate contain the vinyl acetate structural unit in a content greater than or equal to 50% by mole and the fatty acid vinyl ester structural unit in a content less than or equal to 50% by mole, it is further preferred that the modified polyvinyl acetate contain the vinyl acetate structural unit in a content greater than or equal to 70% by mole and the fatty acid vinyl ester structural unit in a content less than or equal to 30% by mole, and it is still further preferred that the modified polyvinyl acetate contain the vinyl acetate structural unit in a content greater than or equal to 75% by mole and the fatty acid vinyl ester structural unit in a content less than or equal to 25% by mole. Moreover, when the proportion of the fatty acid vinyl ester structural unit is less than or equal to the above upper limit, the adhesivity and the strength of the interlayer film are further enhanced.

In 100% by mole of the total of the vinyl acetate structural unit and the fatty acid vinyl ester structural unit, it is preferred that the modified polyvinyl acetate contain the vinyl acetate structural unit in a content less than or equal to 99.9% by mole and the fatty acid vinyl ester structural unit in a content greater than or equal to 0.1% by mole, it is more preferred that the modified polyvinyl acetate contain the vinyl acetate structural unit in a content less than or equal to 99% by mole and the fatty acid vinyl ester structural unit in a content greater than or equal to 1% by mole, it is further preferred that the modified polyvinyl acetate contain the vinyl acetate structural unit in a content less than or equal to 95% by mole and the fatty acid vinyl ester structural unit in a content greater than or equal to 5% by mole, and it is especially preferred that the modified polyvinyl acetate contain the vinyl acetate structural unit in a content less than or equal to 90% by mole and the fatty acid vinyl ester structural unit in a content greater than or equal to 10% by mole. When the proportion of the fatty acid vinyl ester structural unit is greater than or equal to the above lower limit, the alkali resistance of the modified polyvinyl acetate is further enhanced.

It is preferred that the modified polyvinyl acetate be obtained by allowing vinyl acetate and a fatty acid vinyl ester to undergo copolymerization in the presence of a compound (hereinafter, sometimes referred to as Compound X) having a structural unit represented by the formula (X) described above.

Examples of the modified polyvinyl acetate (1) also include a copolymer of vinyl acetate and a fatty acid vinyl ester, and a polymerizable compound (copolymerization component) excluding vinyl acetate and the fatty acid vinyl ester. In the case where the modified polyvinyl acetate is a copolymer of vinyl acetate and a fatty acid vinyl ester, and a polymerizable compound excluding vinyl acetate and the fatty acid vinyl ester, in 100% by mole of the whole structural units, the proportion of the vinyl acetate structural unit is preferably greater than or equal to 50% by mole, more preferably greater than or equal to 60% by mole, further preferably greater than or equal to 70% by mole, especially preferably greater than or equal to 80% by mole, and most preferably greater than or equal to 90% by mole. Examples of the polymerizable compound excluding vinyl acetate and the fatty acid vinyl ester include a monomer having a carboxyl group, a (meth)acrylic compound, a styrene compound, an isoprene compound, and the like.

In a copolymer of vinyl acetate and a fatty acid vinyl ester, and a polymerizable compound (copolymerization component) excluding vinyl acetate and the fatty acid vinyl ester, it is preferred that the polymerizable compound be a monomer having a carboxyl group. The modified polyvinyl acetate may or may not have a structural unit derived from a monomer having a carboxyl group. The structural unit derived from a monomer having a carboxyl group is a structural unit derived from a monomer having a carboxyl group and introduced by the monomer having a carboxyl group. By introducing the structural unit derived from a monomer having a carboxyl group, the sound insulating properties and the alkali resistance of the interlayer film are effectively enhanced, and furthermore, the adhesivity of the interlayer film is further enhanced. In particular, in the case where the interlayer film has second and third layers described below, by allowing the modified polyvinyl acetate to have a structural unit derived from a monomer having a carboxyl group, the adhesive force of the first layer to the second and third layers is further enhanced.

From the viewpoints of effectively enhancing the sound insulating properties and the alkali resistance of the interlayer film and further enhancing the adhesivity of the interlayer film, it is preferred that the monomer having a carboxyl group be (meth)acrylic acid, maleic acid, fumaric acid, crotonic acid, itaconic acid, a monoester of maleic acid, a monoester of fumaric acid or a monoester of itaconic acid.

From the viewpoints of effectively enhancing the sound insulating properties and the alkali resistance of the interlayer film and further enhancing the adhesivity of the interlayer film, in 100% by mole of the total of the vinyl acetate structural unit, the fatty acid vinyl ester structural unit and the structural unit derived from a monomer having a carboxyl group, it is preferred that the modified polyvinyl acetate contain the vinyl acetate structural unit in a content greater than or equal to 45% by mole and less than or equal to 98.99% by mole, the fatty acid vinyl ester structural unit in a content greater than or equal to 1% by mole and less than or equal to 50% by mole, and the structural unit derived from a monomer having a carboxyl group in a content greater than or equal to 0.01% by mole and less than or equal to 5% by mole.

At the time of producing a modified polyvinyl acetate having a vinyl acetate structural unit and a fatty acid vinyl ester structural unit, by allowing vinyl acetate and a fatty acid vinyl ester to undergo copolymerization in the presence of Compound X, particles having a small CV value and a narrow particle diameter distribution can be obtained. Moreover, in this copolymerization reaction, the remaining amount of unreacted monomers is reduced. Reducing the remaining amount of unreacted monomers also enables the alkali resistance of the modified polyvinyl acetate to be enhanced. Accordingly, it is preferred that the modified polyvinyl acetate be obtained by allowing vinyl acetate and a fatty acid vinyl ester to undergo copolymerization in the presence of Compound X.

At the time of allowing vinyl acetate and a fatty acid vinyl ester to undergo copolymerization in the presence of Compound X, it is preferred that suspension polymerization be performed. Performing suspension polymerization gives a modified polyvinyl acetate further excellent in alkali resistance.

It is preferred that the modified polyvinyl acetate be obtained by allowing vinyl acetate in a content greater than or equal to 10% by mole and a fatty acid vinyl ester in a content less than or equal to 90% by mole, in 100% by mole of the total of the vinyl acetate and the fatty acid vinyl ester, to undergo copolymerization in the presence of Compound X. From the viewpoint of obtaining a modified polyvinyl acetate further excellent in alkali resistance, in 100% by mole of the total of the vinyl acetate and the fatty acid vinyl ester, it is preferred that the modified polyvinyl acetate be obtained by allowing vinyl acetate in a content greater than or equal to 45% by mole and a fatty acid vinyl ester in a content less than or equal to 55% by mole to undergo copolymerization, it is more preferred that the modified polyvinyl acetate be obtained by allowing vinyl acetate in a content greater than or equal to 50% by mole and a fatty acid vinyl ester in a content less than or equal to 50% by mole to undergo copolymerization, it is further preferred that the modified polyvinyl acetate be obtained by allowing vinyl acetate in a content greater than or equal to 70% by mole and a fatty acid vinyl ester in a content less than or equal to 30% by mole to undergo copolymerization, and it is still further preferred that the modified polyvinyl acetate be obtained by allowing vinyl acetate in a content greater than or equal to 75% by mole and a fatty acid vinyl ester in a content less than or equal to 25% by mole to undergo copolymerization, in the presence of Compound X. Moreover, when the amount of the fatty acid vinyl ester used is less than or equal to the above upper limit, the adhesivity and the strength of the interlayer film are further enhanced.

In 100% by mole of the total of the vinyl acetate and the fatty acid vinyl ester, it is preferred that the modified polyvinyl acetate be obtained by allowing vinyl acetate in a content less than or equal to 99.9% by mole and a fatty acid vinyl ester in a content greater than or equal to 0.1% by mole to undergo copolymerization, it is more preferred that the modified polyvinyl acetate be obtained by allowing vinyl acetate in a content less than or equal to 99% by mole and a fatty acid vinyl ester in a content greater than or equal to 1% by mole to undergo copolymerization, it is further preferred that the modified polyvinyl acetate be obtained by allowing vinyl acetate in a content less than or equal to 95% by mole and a fatty acid vinyl ester in a content greater than or equal to 5% by mole to undergo copolymerization, and it is especially preferred that the modified polyvinyl acetate be obtained by allowing vinyl acetate in a content less than or equal to 90% by mole and a fatty acid vinyl ester in a content greater than or equal to 10% by mole to undergo copolymerization, in the presence of Compound X. When the amount of the fatty acid vinyl ester used is greater than or equal to the above lower limit, the alkali resistance of the modified polyvinyl acetate is further enhanced.

In 100% by mole of the total of the vinyl acetate, the fatty acid vinyl ester and the monomer having a carboxyl group, it is preferred that the modified polyvinyl acetate be obtained by allowing vinyl acetate in a content greater than or equal to 45% by mole and less than or equal to 98.99% by mole, a fatty acid vinyl ester in a content greater than or equal to 1% by mole and less than or equal to 50% by mole, and a monomer having a carboxyl group in a content greater than or equal to 0.01% by mole and less than or equal to 5% by mole to undergo copolymerization in the presence of Compound X. When the amount of the fatty acid vinyl ester used is less than or equal to the above upper limit, the adhesivity and the strength of the interlayer film are further enhanced. When the amount of the monomer having a carboxyl group used is less than or equal to the above upper limit, the sound insulating properties and the alkali resistance of the interlayer film are effectively enhanced, and furthermore, the adhesivity of the interlayer film is further enhanced.

At the time of allowing vinyl acetate and a fatty acid vinyl ester to undergo copolymerization in the presence of Compound X, it is preferred that a polymerization catalyst be used, it is preferred that a polymerization modifier be used, and it is preferred that a dispersion medium containing water be used. As the polymerization catalyst and the polymerization modifier, a conventionally known polymerization catalyst and a conventionally known polymerization modifier are usable.

For example, Compound X can be obtained by saponifying a copolymer prepared by allowing vinyl acetate and an alkylester of maleic acid to undergo copolymerization. It is preferred that Compound X be obtained by saponifying a copolymer prepared by allowing vinyl acetate and an alkylester of maleic acid to undergo copolymerization. Examples of the alkylester of maleic acid include dimethyl maleate, diethyl maleate, and the like. It is preferred that the alkylester of maleic acid be dimethyl maleate or diethyl maleate.

The number average molecular weight of Compound X is preferably greater than or equal to 3800 and preferably less than or equal to 28500. The number average molecular weight is obtained by the gel permeation chromatography measurement and calculated in terms of standard polyethylene glycol. When the number average molecular weight of Compound X is greater than or equal to the above lower limit and less than or equal to the above upper limit, at the time of allowing vinyl acetate and a fatty acid vinyl ester to undergo copolymerization in a water-based dispersion medium containing Compound X, vinyl acetate, a fatty acid vinyl ester, and water in the presence of Compound X, the solubility of Compound X in water and the protective colloid properties of the vinyl acetate and the fatty acid vinyl ester are improved with good balance. The content of Compound X in 100% by weight of the water-based dispersion medium is preferably greater than or equal to 0.05% by weight and preferably less than or equal to 0.5% by weight. When the content of Compound X is greater than or equal to the above lower limit and less than or equal to the above upper limit, the protective colloid properties are further satisfactorily maintained, the viscosity of the water-based dispersion medium is maintained at a more appropriate level, and the (co)polymerization reaction further efficiently proceeds.

From the viewpoint of obtaining a modified polyvinyl acetate further excellent in alkali resistance, the number of carbon atoms of the fatty acid vinyl ester is preferably less than or equal to 30, more preferably less than or equal to 20, further preferably less than or equal to 18, especially preferably less than or equal to 16, and most preferably less than or equal to 14. When the number of carbon atoms of the fatty acid vinyl ester is less than or equal to 20, the alkali resistance is significantly enhanced and particles of a modified polyvinyl acetate having a smaller CV value can be obtained. Moreover, when the number of carbon atoms is less than or equal to the above upper limit, the adhesivity and the strength of the interlayer film are further enhanced.

From the viewpoint of obtaining a modified polyvinyl acetate further excellent in alkali resistance, the number of carbon atoms of the fatty acid vinyl ester is preferably greater than or equal to 1, more preferably greater than or equal to 5, further preferably greater than or equal to 8, especially preferably greater than or equal to 10, and most preferably greater than or equal to 12. When the number of carbon atoms of the fatty acid vinyl ester is greater than or equal to 5, the alkali resistance is significantly enhanced. Moreover, when the number of carbon atoms is greater than or equal to the above lower limit, the water resistance of the interlayer film is further enhanced.

Examples of the fatty acid vinyl ester include vinyl caprylate, vinyl caprate, vinyl laurate, vinyl myristate, vinyl palmitate, vinyl stearate, vinyl cinnamate, vinyl neodecanoate, vinyl behenate, and the like. Fatty acid vinyl esters other than these may be used. One kind of the fatty acid vinyl ester may be used alone, and two or more kinds thereof may be combinedly used.

From the viewpoint of obtaining a modified polyvinyl acetate further excellent in alkali resistance, it is preferred that the fatty acid vinyl ester be vinyl caprylate, vinyl caprate, vinyl laurate, vinyl myristate, vinyl palmitate, vinyl stearate, vinyl cinnamate or vinyl neodecanoate.

The polymerization degree of the modified polyvinyl acetate is preferably greater than or equal to 1000, preferably less than or equal to 9000, more preferably less than or equal to 7000, and further preferably less than or equal to 5000. When the polymerization degree of the modified polyvinyl acetate is greater than or equal to the above lower limit and less than or equal to the above upper limit, at the time of obtaining the interlayer film and the laminated glass, the melt viscosity is maintained at an appropriate level, and the productivity of the interlayer film is further enhanced. From the viewpoint of still further enhancing the productivity, the polymerization degree of the modified polyvinyl acetate is more preferably greater than or equal to 1500 and more preferably less than or equal to 4000.

The polymerization degree of the modified polyvinyl acetate is determined by a method in accordance with JIS K6725 "Testing method for polyvinyl acetate."

From the viewpoint of further improving the alkali resistance of a modified polyvinyl acetate, it is preferred that the modified polyvinyl acetate before being blended be particles with a median diameter greater than or equal to 100 µm and less than or equal to 800 µm. It is preferred that particles with a median diameter greater than or equal to the above lower limit and less than or equal to the above upper limit be used as the modified polyvinyl acetate to obtain an interlayer film or a first layer. It is preferred that particles of a modified polyvinyl acetate with a median diameter greater than or equal to the above lower limit and less than or equal to the above upper limit be used, and the modified polyvinyl acetate and a plasticizer be blended to obtain the interlayer film or the first layer.

From the viewpoint of obtaining a homogeneous interlayer film, the CV value of particles of the modified polyvinyl acetate before being blended is preferably less than or equal to 0.8% and more preferably less than or equal to 0.5%. It is preferred that particles with a CV value less than or equal to the above upper limit be used as the modified polyvinyl acetate to obtain an interlayer film or a first layer. It is preferred that particles of a modified polyvinyl acetate with a CV value less than or equal to the above upper limit be used, and the modified polyvinyl acetate and a plasticizer be blended to obtain the interlayer film or the first layer. The CV value is determined by the formula: the standard deviation of the particle size distribution/the volume average particle diameter (D50)×100.

It is preferred that the interlayer film include a polyvinyl acetal resin (hereinafter, sometimes referred to as a polyvinyl acetal resin (0)). It is preferred that the first layer include a polyvinyl acetal resin (hereinafter, sometimes referred to as a polyvinyl acetal resin (1)). When the interlayer film includes a polyvinyl acetal resin (0), particularly the first layer includes a polyvinyl acetal resin (1), the production efficiency of the interlayer film for laminated glass is enhanced. It is preferred that the polyvinyl acetal resin (0) and the polyvinyl acetal resin (1) each be a polyvinyl acetal resin with an acetylation degree less than 8% by mole (hereinafter, referred to also as a "polyvinyl acetal resin (A)") or a polyvinyl acetal resin with an acetylation degree greater than or equal to 8% by mole (hereinafter, referred to also as a "polyvinyl acetal resin (B)").

The acetylation degree (a) of the polyvinyl acetal resin (A) is less than 8% by mole, preferably less than or equal to 7.5% by mole, preferably less than or equal to 7% by mole, preferably less than or equal to 6% by mole, preferably less than or equal to 5% by mole, preferably greater than or equal to 0.1% by mole, preferably greater than or equal to 0.5% by mole, preferably greater than or equal to 0.8% by mole, preferably greater than or equal to 1% by mole, preferably greater than or equal to 2% by mole, preferably greater than or equal to 3% by mole, and preferably greater than or equal to 4% by mole. When the acetylation degree (a) is less than or equal to the above upper limit and greater than or equal to the above lower limit, the compatibility between a polyvinyl acetal resin (A) and a plasticizer is further enhanced, and it is possible to further enhance the sound insulating properties of laminated glass.

A preferred lower limit of the acetalization degree (a) of the polyvinyl acetal resin (A) is 68% by mole, a more preferred lower limit is 70% by mole, a further preferred lower limit is 71% by mole, an especially preferred lower limit is 72% by mole, a preferred upper limit is 85% by mole, a more preferred upper limit is 83% by mole, a further preferred upper limit is 81% by mole, and an especially preferred upper limit is 79% by mole. When the acetalization degree (a) is greater than or equal to the above lower limit, it is possible to further enhance the sound insulating properties of laminated glass. When the acetalization degree (a) is less than or equal to the above upper limit, the reaction time required for producing the polyvinyl acetal resin (A) can be shortened.

The content ratio (a) of hydroxyl groups of the polyvinyl acetal resin (A) is preferably less than or equal to 30% by mole, preferably less than or equal to 27.5% by mole, preferably less than or equal to 27% by mole, preferably less than or equal to 26% by mole, preferably less than or equal to 25% by mole, preferably less than or equal to 24% by mole, preferably less than or equal to 23% by mole, preferably greater than or equal to 16% by mole, preferably greater than or equal to 18% by mole, preferably greater than or equal to 19% by mole, and preferably greater than or equal to 20% by mole. When the content ratio (a) of hydroxyl groups is less than or equal to the above upper limit, it is possible to further enhance the sound insulating properties of laminated glass. When the content ratio (a) of hydroxyl groups is greater than or equal to the above lower limit, it is possible to further enhance the adhesive force of the interlayer film.

It is preferred that the polyvinyl acetal resin (A) be a polyvinyl butyral resin.

The acetylation degree (b) of the polyvinyl acetal resin (B) is greater than or equal to 8% by mole, preferably greater than or equal to 9% by mole, preferably greater than or equal to 10% by mole, preferably greater than or equal to 11% by mole, preferably greater than or equal to 12% by mole, preferably less than or equal to 30% by mole, preferably less than or equal to 28% by mole, preferably less than or equal to 26% by mole, preferably less than or equal to 24% by mole, preferably less than or equal to 20% by mole, and preferably less than or equal to 19.5% by mole. When the acetylation degree (b) is greater than or equal to the above lower limit, it is possible to further enhance the sound insulating properties of laminated glass. When the acetylation degree (b) is less than or equal to the above upper limit, the reaction time required for producing the polyvinyl acetal resin (B) can be shortened. Above all, since the reaction time required for producing the polyvinyl acetal resin (B) can be further shortened, it is preferred that the acetylation degree (b) of the polyvinyl acetal resin (B) be less than 20% by mole.

A preferred lower limit of the acetalization degree (b) of the polyvinyl acetal resin (B) is 50% by mole, a more preferred lower limit is 52.5% by mole, a further preferred lower limit is 54% by mole, an especially preferred lower limit is 60% by mole, a preferred upper limit is 80% by mole, a more preferred upper limit is 77% by mole, a further preferred upper limit is 74% by mole, and an especially preferred upper limit is 71% by mole. When the acetalization degree (b) is greater than or equal to the above lower limit, it is possible to further enhance the sound insulating properties of laminated glass. When the acetalization degree (b) is less than or equal to the above upper limit, the reaction time required for producing the polyvinyl acetal resin (B) can be shortened.

The content ratio (b) of hydroxyl groups of the polyvinyl acetal resin (B) is preferably less than or equal to 30% by mole, preferably less than or equal to 27.5% by mole, preferably less than or equal to 27% by mole, preferably less than or equal to 26% by mole, preferably less than or equal to 25% by mole, preferably greater than or equal to 18% by mole, preferably greater than or equal to 20% by mole, preferably greater than or equal to 22% by mole, and preferably greater than or equal to 23% by mole. When the content ratio (b) of hydroxyl groups is less than or equal to the above upper limit, it is possible to further enhance the sound insulating properties of laminated glass. When the content ratio (b) of hydroxyl groups is greater than or equal to the above lower limit, it is possible to further enhance the adhesive force of the interlayer film.

It is preferred that the polyvinyl acetal resin (B) be a polyvinyl butyral resin.

It is preferred that the polyvinyl acetal resin (A) and the polyvinyl acetal resin (B) be obtained by acetalizing a polyvinyl alcohol resin having an average polymerization degree greater than 3000 with an aldehyde. It is preferred that the aldehyde be an aldehyde with 1 to 10 carbon atoms, and it is more preferred that the aldehyde be an aldehyde with 4 or 5 carbon atoms. A preferred lower limit of the average polymerization degree of the polyvinyl alcohol resin is 3010, a preferred lower limit is 3050, a preferred lower limit is 3500, a preferred lower limit is 3600, a preferred lower limit is 4000, a preferred lower limit is 4050, a preferred upper limit is 7000, a preferred upper limit is 6000, a preferred upper limit is 5000, a preferred upper limit is 4900, and a preferred upper limit is 4500. It is especially preferred that the polyvinyl acetal resins (A) and (B) in the first layer be obtained by acetalizing a polyvinyl alcohol resin having an average polymerization degree greater than 3000 and less than 4000. In particular, since the generation of bubbles and the growth of bubbles in laminated glass can be further suppressed, the sound insulating properties of laminated glass can be sufficiently enhanced, and the resin can be easily formed into an interlayer film, the average polymerization degree of the polyvinyl alcohol resin used for obtaining the polyvinyl acetal resins (A) and (B) in the first layer is preferably greater than or equal to 3010, more preferably greater than or equal to 3020, preferably less than or equal to 4000, more preferably less than 4000, further preferably less than or equal to 3800, especially preferably less than or equal to 3600, and most preferably less than or equal to 3500.

In the case where the interlayer film includes a modified polyvinyl acetate and a polyvinyl acetal resin (0), the proportion of the modified polyvinyl acetate in 100% by weight of the total of the modified polyvinyl acetate and the polyvinyl acetal resin (0) is preferably greater than or equal to 1% by weight, more preferably greater than or equal to 10% by weight, further preferably greater than or equal to 20% by weight, especially preferably greater than or equal to 50% by weight, preferably less than or equal to 99% by weight, more preferably less than or equal to 90% by weight, and further preferably less than or equal to 80% by weight. When the proportion is less than or equal to the above upper limit, the production efficiency of the interlayer film for laminated glass is further enhanced. When the proportion is greater than or equal to the above lower limit, it is possible to further enhance the sound insulating properties of laminated glass. In the case where the interlayer film is provided with only the first layer, it is preferred that the proportion of the modified polyvinyl acetate be greater than or equal to the above lower limit and less than or equal to the above upper limit.

In the case where the first layer includes a modified polyvinyl acetate and a polyvinyl acetal resin (1), the proportion of the modified polyvinyl acetate in 100% by weight of the total of the modified polyvinyl acetate and the polyvinyl acetal resin (1) is preferably greater than or equal to 1% by weight, more preferably greater than or equal to 10% by weight, further preferably greater than or equal to 20% by weight, especially preferably greater than or equal to 50% by weight, preferably less than or equal to 99% by weight, more preferably less than or equal to 90% by weight, and further preferably less than or equal to 80% by weight. When the proportion is less than or equal to the above upper limit, the production efficiency of the interlayer film for laminated glass is further enhanced. When the proportion is greater than or equal to the above lower limit, it is possible to further enhance the sound insulating properties of laminated glass.

It is preferred that the second layer include a thermoplastic resin, and it is more preferred that the second layer include a polyvinyl acetal resin (hereinafter, sometimes referred to as a polyvinyl acetal resin (2)). It is preferred that the third layer include a thermoplastic resin, and it is more preferred that the third layer include a polyvinyl acetal resin (hereinafter, sometimes referred to as a polyvinyl acetal resin (3)). When the second and third layers include polyvinyl acetal resins (2) and (3) respectively, the adhesive force between each of the second and third layers and the laminated glass constituent member is sufficiently enhanced. In each of the second and third layers, one kind of the thermoplastic resin may be used alone, and two or more kinds thereof may be combinedly used. One kind of each of the polyvinyl acetal resins (2) and (3) may be used alone, and two or more kinds thereof may be combinedly used. The thermoplastic resins used for the second and third layers are not particularly limited. The polyvinyl acetal resins (2) and (3) used for the second and third layers are not particularly limited.

Examples of the thermoplastic resin include a polyvinyl acetal resin, an ethylene-vinyl acetate copolymer resin, an ethylene-acrylic copolymer resin, a polyurethane resin, a polyvinyl alcohol resin, and the like.

The acetylation degree of each of the polyvinyl acetal resins (2) and (3) is preferably greater than or equal to 0% by mole, more preferably greater than or equal to 0.1% by mole, further preferably greater than or equal to 0.5% by mole, preferably less than or equal to 30% by mole, more preferably less than or equal to 20% by mole, further preferably less than or equal to 15% by mole, still further preferably less than or equal to 10% by mole, especially preferably less than or equal to 5% by mole, and most preferably less than or equal to 3% by mole. When the acetylation degree is less than or equal to the above upper limit, the penetration resistance of the interlayer film and laminated glass is enhanced. Furthermore, when the acetylation degree is less than or equal to the above upper limit, it is possible to suppress the bleeding out of the plasticizer.

Moreover, when the acetylation degree of the polyvinyl acetal resin in each of the polyvinyl acetal resins (2) and (3) is less than or equal to 3% by mole, the mechanical properties of the interlayer film are further enhanced. As a result, the penetration resistance of laminated glass is further enhanced.

The acetylation degree is a value expressing the mole fraction determined by dividing a value, that is obtained by subtracting the amount of ethylene groups to which the acetal group is bonded and the amount of ethylene groups to which the hydroxyl group is bonded from the total amount of ethylene groups in the main chain, by the total amount of ethylene groups in the main chain in terms of percentage (% by mole). For example, the amount of ethylene groups to which the acetal group is bonded can be measured in accordance with JIS K6728 "Testing methods for polyvinyl butyral."

For example, the polyvinyl acetal resins (2) and (3) can be produced by acetalizing polyvinyl alcohol with an aldehyde. For example, the polyvinyl alcohol is obtained by saponifying polyvinyl acetate.

The average polymerization degree of the polyvinyl alcohol for obtaining the polyvinyl acetal resins (2) and (3) is preferably greater than or equal to 200, more preferably greater than or equal to 500, further preferably greater than or equal to 1600, especially preferably greater than or equal to 2600, most preferably greater than or equal to 2700, preferably less than or equal to 5000, more preferably less than or equal to 4000, and further preferably less than or equal to 3500. When the average polymerization degree is greater than or equal to the above lower limit, the penetration resistance of laminated glass is further enhanced. When the average polymerization degree is less than or equal to the above upper limit, the resin is easily formed into an interlayer film.

The average polymerization degree of the polyvinyl alcohol is determined by a method in accordance with JIS K6726 "Testing methods for polyvinyl alcohol."

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin be 3 to 5, and from the viewpoint of enhancing the productivity, it is more preferred that the number of carbon atoms of the acetal group be 3 or 4.

The aldehyde is not particularly limited. In general, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Of these, propionaldehyde, n-butyraldehyde, isobutyraldehyde, n-hexylaldehyde or n-valeraldehyde is preferred, propionaldehyde, n-butyraldehyde or isobutyraldehyde is more preferred, and n-butyraldehyde is further preferred. One kind of the aldehyde may be used alone, and two or more kinds thereof may be combinedly used.

It is preferred that the polyvinyl acetal resins (2) and (3) each be a polyvinyl butyral resin. It is preferred that the interlayer film for laminated glass according to the present invention include polyvinyl butyral resins as the polyvinyl acetal resins (2) and (3) included in the second and third layers, respectively. The synthesis of the polyvinyl butyral resin is easy. Furthermore, by the use of the polyvinyl butyral resin, the adhesive force of the interlayer film to a laminated glass constituent member is further moderately developed. Furthermore, the light resistance, the weather resistance, and the like are further enhanced.

The content ratio of hydroxyl groups (the amount of hydroxyl groups) of each of the polyvinyl acetal resins (2) and (3) is preferably greater than or equal to 20% by mole, more preferably greater than or equal to 25% by mole, further preferably greater than or equal to 30% by mole, preferably less than or equal to 50% by mole, more preferably less than or equal to 45% by mole, further preferably less than or equal to 40% by mole, and especially preferably less than or equal to 35% by mole. When the content ratio of hydroxyl groups is greater than or equal to the above lower limit, the penetration resistance of laminated glass is further enhanced. Moreover, when the content ratio of hydroxyl groups is less than or equal to the above upper limit, the plasticizer hardly bleeds out. Furthermore, the flexibility of the interlayer film is enhanced and the handling of the interlayer film is facilitated.

The content ratio of hydroxyl groups of each of the polyvinyl acetal resins (2) and (3) is a value expressing the mole fraction determined by dividing the amount of ethylene groups to which the hydroxyl group is bonded by the total amount of ethylene groups in the main chain in terms of percentage (% by mole). For example, the amount of ethylene groups to which the hydroxyl group is bonded can be determined through measurement in accordance with JIS K6726 "Testing methods for polyvinyl alcohol."

The acetalization degree of each of the polyvinyl acetal resins (2) and (3) (the butyralization degree in the case of a polyvinyl butyral resin) is preferably greater than or equal to 55% by mole, more preferably greater than or equal to 60% by mole, further preferably greater than or equal to 63% by mole, preferably less than or equal to 85% by mole, more preferably less than or equal to 75% by mole, and further preferably less than or equal to 70% by mole. When the acetalization degree is greater than or equal to the above lower limit, the compatibility between each of polyvinyl acetal resins (2) and (3) and a plasticizer is enhanced. When the acetalization degree is less than or equal to the above upper limit, the reaction time required for producing the polyvinyl acetal resin is shortened.

The acetalization degree is a value expressing the mole fraction determined by dividing the amount of ethylene groups to which the acetal group is bonded by the total amount of ethylene groups in the main chain in terms of percentage (% by mole).

The acetalization degree can be calculated by measuring the acetylation degree and the content ratio of hydroxyl groups by a method in accordance with JIS K6728 "Testing methods for polyvinyl butyral," calculating the mole fraction from the measurement results obtained, and then subtracting the acetylation degree and the content ratio of hydroxyl groups from 100% by mole.

In the case where the polyvinyl acetal resin is a polyvinyl butyral resin, the acetalization degree (the butyralization degree) and the acetylation degree can be calculated from the results measured by a method in accordance with JIS K6728 "Testing methods for polyvinyl butyral" or ASTM D1396-92. The measurement by a method in accordance with ASTM D1396-92 is preferred.

From the viewpoint of further enhancing the sound insulating properties of laminated glass, it is preferred that the acetylation degree of the polyvinyl acetal resin in the second layer be less than or equal to 15% by mole and the content ratio of hydroxyl groups therein be greater than or equal to 20% by mole. From the viewpoint of further enhancing the sound insulating properties of laminated glass, it is preferred that the acetylation degree of the polyvinyl acetal resin in the third layer be less than or equal to 15% by mole and the content ratio of hydroxyl groups therein be greater than or equal to 20% by mole.

(Plasticizer)

The interlayer film includes a plasticizer (hereinafter, sometimes referred to as a plasticizer (0)). It is preferred that the first layer include a plasticizer (hereinafter, sometimes referred to as a plasticizer (1)). It is preferred that the second layer include a plasticizer (hereinafter, sometimes referred to as a plasticizer (2)). It is preferred that the third layer include a plasticizer (hereinafter, sometimes referred to as a plasticizer (3)). One kind of each of the plasticizers (0), (1), (2) and (3) may be used alone, and two or more kinds thereof may be combinedly used. In this connection, in the case where the interlayer film is provided with only the first layer, the plasticizer (0) and the plasticizer (1) are the same as each other.

Examples of the plasticizers (0), (1), (2) and (3) include organic ester plasticizers such as a monobasic organic acid ester and a polybasic organic acid ester, phosphate plasticizers such as an organic phosphate plasticizer and an organic phosphite plasticizer, and the like. Of these, organic ester plasticizers are preferred. It is preferred that the plasticizers (0), (1), (2) and (3) be liquid plasticizers.

The monobasic organic acid ester is not particularly limited, and examples thereof include a glycol ester obtained by the reaction of a glycol with a monobasic organic acid, an ester of triethylene glycol or tripropylene glycol and a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid and the like.

The polybasic organic acid ester is not particularly limited, and examples thereof include an ester compound of a polybasic organic acid and an alcohol having a linear or branched structure of 4 to 8 carbon atoms. Examples of the polybasic organic acid include adipic acid, sebacic acid, azelaic acid and the like.

The organic ester plasticizer is not particularly limited and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dibutyl adipate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used.

The organic phosphate plasticizer is not particularly limited, and examples thereof include tributoxyethyl phosphate, isodecyl phenyl phosphate, triisopropyl phosphate, and the like.

From the viewpoint of further enhancing the sound insulating properties of laminated glass, it is preferred that each of the plasticizer (0) in the interlayer film and the plasticizer (1) in the first layer be a diester plasticizer represented by the following formula (1). From the viewpoint of further enhancing the sound insulating properties of laminated glass, it is preferred that each of the plasticizer (2) in the second layer and the plasticizer (3) in the third layer be a diester plasticizer represented by the following formula (1):

[Chemical 3]

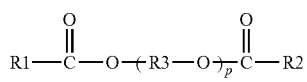

Formula (1)

wherein R1 and R2 each represent an organic group with 5 to 10 carbon atoms, R3 represents an ethylene group, an isopropylene group or an n-propylene group, and p represents an integer of 3 to 10.

It is preferred that the plasticizers (0) and (1) include at least one kind among an adipic acid ester, triethylene glycol di-2-ethylhexanoate (3GO) and triethylene glycol di-2-ethylbutyrate (3GH), it is more preferred the plasticizers (0) and (1) include at least one kind among triethylene glycol di-2-ethylhexanoate and triethylene glycol di-2-ethylbutyrate, and it is further preferred that the plasticizers (0) and (1) include triethylene glycol di-2-ethylhexanoate.

It is preferred that each of the plasticizers (2) and (3) include at least one kind among triethylene glycol di-2-ethylhexanoate (3GO) and triethylene glycol di-2-ethylbutyrate (3GH), and it is more preferred that each of the plasticizers (2) and (3) include triethylene glycol di-2-ethylhexanoate.

In the interlayer film, relative to 100 parts by weight of the modified polyvinyl acetate, the content of the plasticizer (0) is preferably greater than or equal to 25 parts by weight and preferably less than or equal to 80 parts by weight. From the viewpoint of further enhancing the sound insulating properties of laminated glass, in the interlayer film, relative to 100 parts by weight of the modified polyvinyl acetate, the content of the plasticizer (0) is more preferably greater than or equal to 30 parts by weight, more preferably less than or equal to 70 parts by weight, further preferably less than or equal to 60 parts by weight, and especially preferably less than or equal to 50 parts by weight. Moreover, when the content of the plasticizer (0) is greater than or equal to the above lower limit, the flexibility of the interlayer film is enhanced, the handling of the interlayer film is facilitated, and furthermore, the penetration resistance of laminated glass is further enhanced. When the content of the plasticizer (0) is less than or equal to the above upper limit, the transparency of the interlayer film is further enhanced. In the case where the interlayer film is provided with only the first layer, it is preferred that the content of the plasticizer (0) be greater than or equal to the above lower limit and less than or equal to the above upper limit.

In the interlayer film, relative to 100 parts by weight of the thermoplastic resin or relative to 100 parts by weight of the total of the modified polyvinyl acetate and the polyvinyl acetal resin, the content of the plasticizer (0) is preferably greater than or equal to 25 parts by weight and preferably less than or equal to 80 parts by weight. From the viewpoint of further enhancing the sound insulating properties of laminated glass, in the interlayer film, relative to 100 parts by weight of the thermoplastic resin or relative to 100 parts by weight of the total of the modified polyvinyl acetate and the polyvinyl acetal resin, the content of the plasticizer (0) is more preferably greater than or equal to 30 parts by weight, more preferably less than or equal to 70 parts by weight, further preferably less than or equal to 60 parts by weight, and especially preferably less than or equal to 50 parts by weight. Moreover, when the content of the plasticizer (0) is greater than or equal to the above lower limit, the flexibility of the interlayer film is enhanced, the handling of the interlayer film is facilitated, and furthermore, the penetration resistance of laminated glass is further enhanced. When the content of the plasticizer (0) is less than or equal to the above upper limit, the transparency of the interlayer film is further enhanced. In the case where the interlayer film is provided with only the first layer, it is preferred that the content of the plasticizer (0) be greater than or equal to the above lower limit and less than or equal to the above upper limit.

In the first layer, relative to 100 parts by weight of the modified polyvinyl acetate, the content of the plasticizer (1) is preferably greater than or equal to 25 parts by weight and preferably less than or equal to 80 parts by weight. From the viewpoint of further enhancing the sound insulating properties of laminated glass, in the first layer, relative to 100 parts by weight of the modified polyvinyl acetate, the content of the plasticizer (1) is more preferably greater than or equal to 30 parts by weight, more preferably less than or equal to 70 parts by weight, further preferably less than or equal to 60 parts by weight, and especially preferably less than or equal to 50 parts by weight. In the first layer, relative to 100 parts by weight of the total of the modified polyvinyl acetate and the polyvinyl acetal resin (1), the content of the plasticizer (1) is preferably greater than or equal to 25 parts by weight and preferably less than or equal to 80 parts by weight. From the viewpoint of further enhancing the sound insulating properties of laminated glass, in the first layer, relative to 100 parts by weight of the total of the modified polyvinyl acetate and the polyvinyl acetal resin (1), the content of the plasticizer (1) is more preferably greater than or equal to 30 parts by weight, more preferably less than or equal to 70 parts by weight, further preferably less than or equal to 60 parts by weight, and especially preferably less than or equal to 50 parts by weight. Moreover, when the content of the plasticizer (1) is greater than or equal to the above lower limit, the flexibility of the interlayer film is enhanced, the handling of the interlayer film is facilitated, and furthermore, the penetration resistance of laminated glass is further enhanced. When the content of the plasticizer (1) is less than or equal to the above upper limit, the transparency of the interlayer film is further enhanced.

In the second layer, relative to 100 parts by weight of the polyvinyl acetal resin (2), the content of the plasticizer (2) is preferably greater than or equal to 5 parts by weight, more preferably greater than or equal to 10 parts by weight, further preferably greater than or equal to 15 parts by weight, preferably less than or equal to 50 parts by weight, more preferably less than or equal to 45 parts by weight, and further preferably less than or equal to 40 parts by weight. In the third layer, relative to 100 parts by weight of the polyvinyl acetal resin (3), the content of the plasticizer (3) is preferably greater than or equal to 5 parts by weight, more preferably greater than or equal to 10 parts by weight, further preferably greater than or equal to 15 parts by weight, preferably less than or equal to 50 parts by weight, more preferably less than or equal to 45 parts by weight, and further preferably less than or equal to 40 parts by weight. When the content of each of the plasticizers (2) and (3) is greater than or equal to the above lower limit, the flexibility of the interlayer film is enhanced and the handling of the interlayer film is facilitated. When the content of each of the plasticizers (2) and (3) is less than or equal to the above upper limit, the penetration resistance of laminated glass is further enhanced.

It is preferred that the content of the plasticizer (2) (hereinafter, sometimes referred to as the content (2)) in the second layer relative to 100 parts by weight of the polyvinyl acetal resin (2) in the second layer be smaller than the content of the plasticizer (1) (hereinafter, sometimes referred to as the content (1)) in the first layer relative to 100 parts by weight of the modified polyvinyl acetate in the first layer. Moreover, it is preferred that the content of the plasticizer (3) (hereinafter, sometimes referred to as the content (3)) in the third layer relative to 100 parts by weight of the polyvinyl acetal resin (3) in the third layer be smaller than the content (1) of the plasticizer (1) in the first layer relative to 100 parts by weight of the modified polyvinyl acetate in the first layer. It is preferred that the content (2) be smaller than the content (1). Moreover, it is preferred that the content (3) be smaller than the content (1). By allowing each of the contents (2) and (3) to be smaller than the content (1), the penetration resistance of the laminated glass is further enhanced.

Each of an absolute value of the difference between the content (1) and the content (2) and an absolute value of the difference between the content (1) and the content (3) is preferably greater than or equal to 1 part by weight, more preferably greater than or equal to 2 parts by weight, further preferably greater than or equal to 10 parts by weight, especially preferably greater than or equal to 15 parts by weight, most preferably greater than or equal to 20 parts by weight, preferably less than or equal to 40 parts by weight, more preferably less than or equal to 35 parts by weight, and further preferably less than or equal to 30 parts by weight. When the absolute value of the difference between the content (1) and each of the contents (2) and (3) is greater than or equal to the above lower limit, the sound insulating properties of laminated glass are further enhanced, and when less than or equal to the above upper limit, the penetration resistance of laminated glass is further enhanced.

(Other Ingredients)

Each of the interlayer film, the first layer, the second layer and the third layer may include additives such as an ultraviolet ray absorber, an oxidation inhibitor, a light stabilizer, a flame retardant, an antistatic agent, a pigment, a dye, an adhesive force regulating agent, a moisture-proofing agent, a fluorescent brightening agent, and an infrared ray absorber, as necessary. One kind of these additives may be used alone, and two or more kinds thereof may be combinedly used.

(Interlayer Film for Laminated Glass)

From the viewpoint of further enhancing the sound insulating properties of laminated glass, the peak temperature of tan δ observed at the lowest temperature side when the interlayer film for laminated glass according to the present invention is measured at a frequency of 1 Hz is preferably less than or equal to 0° C.

From the viewpoint of further enhancing the sound insulating properties of laminated glass at a low temperature, the maximum value of tan δ at the peak temperature of tan δ observed at the lowest temperature side when being measured at a frequency of 1 Hz is preferably greater than or equal to 1.15 and more preferably greater than or equal to 1.25.

From the viewpoint of further enhancing the sound insulating properties of laminated glass at a high temperature, the maximum value of tan δ at the peak temperature of tan δ observed at the highest temperature side when being measured at a frequency of 1 Hz is preferably greater than or equal to 0.50.

In this connection, at the time of measuring the peak temperature of tan δ observed at the lowest temperature side, the maximum value of tan δ at the peak temperature of tan δ observed at the lowest temperature side, and the maximum value of tan δ at the peak temperature of tan δ observed at the highest temperature side, it is preferred that measurement be conducted after an interlayer film for laminated glass is stored for 1 month under the condition of 23° C.

The thickness of the first layer is preferably greater than or equal to 0.02 mm, more preferably greater than or equal to 0.05 mm, preferably less than or equal to 1.8 mm, and more preferably less than or equal to 0.5 mm. When the thickness of the first layer is greater than or equal to the above lower limit and less than or equal to the above upper limit, the interlayer film does not become too thick and the sound insulating properties of laminated glass are further enhanced.

The thickness of each of the second and third layers is preferably greater than or equal to 0.1 mm, more preferably greater than or equal to 0.2 mm, preferably less than or equal to 1 mm, and more preferably less than or equal to 0.5 mm. When the thickness of each of the second and third layers is greater than or equal to the above lower limit and less than or equal to the above upper limit, the interlayer film does not become too thick, the sound insulating properties of laminated glass are further enhanced, and furthermore, it is possible to suppress the bleeding out of the plasticizer.

The thickness of the interlayer film for laminated glass according to the present invention is preferably greater than or equal to 0.1 mm, more preferably greater than or equal to 0.25 mm, preferably less than or equal to 3 mm, and more preferably less than or equal to 1.5 mm. When the thickness of the interlayer film is greater than or equal to the above lower limit, the penetration resistance of laminated glass is sufficiently enhanced. When the thickness of the interlayer film is less than or equal to the above upper limit, the transparency of the interlayer film is further improved.

The production method of the interlayer film for laminated glass according to the present invention is not particularly limited. As the production method of the interlayer film, a conventionally known method can be used. Examples thereof include a production method of kneading a modified polyvinyl acetate or a polyvinyl acetal resin, a plasticizer and other ingredients blended as necessary and molding an interlayer film, and the like. A production method of extrusion-molding is preferred because the method is suitable for continuous production.

The method for kneading is not particularly limited. Examples of this method include a method using an extruder, a plastograph, a kneader, a banbury mixer, a calender roll, or the like. Of these, a method using an extruder is preferred and a method using a twin screw extruder is more preferred because the methods are suitable for continuous production. In this connection, with regard to the interlayer film for laminated glass according to the present invention, a first layer and second and third layers are separately prepared, after which the first layer and the second and third layers may be layered to obtain a multilayer interlayer film, and a first layer and second and third layers may be layered by coextrusion to obtain an interlayer film.

It is preferred that respective polyvinyl acetal resins contained in the second and third layers be the same as each other, it is more preferred that respective polyvinyl acetal resins contained in the second and third layers be the same as each other and respective plasticizers contained therein be the same as each other, and it is further preferred that respective resin compositions forming the second and third layers be the same as each other since the interlayer films are excellent in production efficiency.

(Laminated Glass)

FIG. 3 shows laminated glass prepared using an interlayer film for laminated glass in accordance with one embodiment of the present invention illustrated as a cross-sectional view.

The laminated glass 11 shown in FIG. 3 is provided with an interlayer film 1 and first and second laminated glass constituent members 21 and 22. The interlayer film 1 is sandwiched between the first and second laminated glass constituent members 21 and 22. The first laminated glass constituent member 21 is layered on a first surface 1a of the interlayer film 1. The second laminated glass constituent member 22 is layered on a second surface 1b opposite to the first surface 1a of the interlayer film 1. The first laminated glass constituent member 21 is layered on an outer surface 3a of a second layer 3. The second laminated glass constituent member 22 is layered on an outer surface 4a of a third layer 4.

The laminated glass 16 shown in FIG. 4 is provided with an interlayer film 31 and first and second laminated glass constituent members 21 and 22. The interlayer film 31 is sandwiched between the first and second laminated glass constituent members 21 and 22. The first laminated glass constituent member 21 is layered on a first surface 31a of the interlayer film 31. The second laminated glass constituent member 22 is layered on a second surface 31b opposite to the first surface 31a of the interlayer film 31.

As described above, the laminated glass according to the present invention is provided with a first laminated glass constituent member, a second laminated glass constituent member, and an interlayer film sandwiched between the first and second laminated glass constituent members, and as the interlayer film, the interlayer film for laminated glass according to the present invention is used.

Examples of the first and second laminated glass constituent members include a glass plate, a PET (polyethylene terephthalate) film and the like. As the laminated glass, laminated glass in which an interlayer film is sandwiched between a glass plate and a PET film or the like, as well as laminated glass in which an interlayer film is sandwiched between two glass plates, is included. Laminated glass is a laminate provided with a glass plate, and it is preferred that at least one glass plate be used.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wire plate glass, lined plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

Although the thickness of each of the first and second laminated glass constituent members is not particularly limited, it is preferred that the thickness lie within the range of 1 to 5 mm. In the case where the laminated glass constituent member is a glass plate, it is preferred that the thickness of the glass plate lie within the range of 1 to 5 mm. In the case where the laminated glass constituent member is a PET film, it is preferred that the thickness of the PET film lie within the range of 0.03 to 0.5 mm.

The production method of the laminated glass is not particularly limited. For example, the interlayer film is sandwiched between the first and second laminated glass constituent members, and the air remaining between each of the first and second laminated glass constituent members and the interlayer film is removed by allowing the laminated body to pass through a pressing roll or by putting the laminated body into a rubber bag and performing decompression suction to be sucked under reduced pressure. Then, laminated body is preliminarily bonded together at about 70 to 100° C. to obtain a laminate. Next, by putting the laminate into an autoclave or by pressing the laminate, laminate is press-bonded together at about 120 to 150° C. and under a pressure of 1 to 1.5 MPa. In this way, laminated glass can be obtained.

The laminated glass can be used for automobiles, railway vehicles, aircraft, ships, buildings and the like. The laminated glass can also be used for applications other than these applications. It is preferred that the interlayer film be an interlayer film for construction or for vehicles, and it is more preferred that the interlayer film be an interlayer film for vehicles. It is preferred that the laminated glass be laminated glass for construction or for vehicles, and it is more preferred that the laminated glass be laminated glass for vehicles. The interlayer film and the laminated glass can also be used for applications other than these applications. The interlayer film and the laminated glass are suitably used for electric vehicles employing an electric motor and hybrid electric vehicles employing an internal combustion engine and an electric motor. The laminated glass can be used for a windshield, side glass, rear glass or roof glass of an automobile, and the like.

Hereinafter, the present invention will be described in more detail with reference to examples. The present invention is not limited only to these examples.

Synthesis Example 1

(1) Synthesis of Compound Corresponding to Compound X

In a polymerization vessel, 17 parts by weight of vinyl acetate, 14 parts by weight of methanol, 0.023 part by weight of dimethyl maleate, 0.257 part by weight of itaconic acid, and 0.17 part by weight of azoisobutyronitrile were placed. After the inside of the polymerization vessel was replaced with nitrogen, the contents in the polymerization vessel were heated to boiling.

Moreover, a liquid mixture of 6 parts by weight of vinyl acetate, 5 parts by weight of methanol, and 0.207 part by weight of dimethyl maleate was prepared. To the inside of the polymerization vessel, the liquid mixture was continuously added until the polymerization rate reached 75% to perform polymerization, and the polymerization was stopped when the polymerization rate reached 90%. Then, unpolymerized vinyl acetate was removed by a routine procedure to obtain a polymer. The obtained polymer was saponified by a routine procedure with sodium hydroxide. Then, the saponified product was subjected to hot air drying at 90° C. for 90 minutes to obtain a compound which has a number average molecular weight of 11000 and a saponification degree of 88.0% by mole and corresponds to Compound X.

The absorbance at a wavelength of 270 nm of an aqueous solution containing 0.2% by weight of the obtained compound corresponding to Compound X and 99.8% by weight of water was determined to be 1.0. Here, the number average molecular weight of the obtained compound corresponding to Compound X was measured at 40° C. with GPC using an aqueous solution of a sample concentration of 0.2 w/v %.

(2) Synthesis of Modified Polyvinyl Acetate

A glass-made polymerization vessel equipped with a reflux condenser, a dropping funnel, a thermometer and a nitrogen inlet was prepared. In this polymerization vessel, 270 parts by weight of ion-exchanged water and 0.1 part by weight of the obtained compound corresponding to Compound X were placed, and the contents were heated and stirred to dissolve the compound corresponding to Compound X.

Next, the temperature inside the polymerization vessel was set to 58° C., 0.08 part by weight of lauroyl peroxide as a polymerization initiator, 100 parts by weight of a vinyl acetate monomer, and 20 parts by weight of a vinyl ester of neodecanoic acid were added and allowed to undergo polymerization for 6 hours to obtain particles of a modified polyvinyl acetate.

Synthesis Examples 2 to 8

A modified polyvinyl acetate was obtained in the same manner as that in Synthesis Example 1 except that, at the time of the suspension polymerization for obtaining the modified polyvinyl acetate, the kind of a compound used, the amount of vinyl acetate used, the kind of a fatty acid vinyl ester (number of carbon atoms), the amount of a fatty acid vinyl ester used, and the polymerization degree of the resulting modified polyvinyl acetate each were set to those listed in the following Table 1.

Synthesis Example 9

(1) Synthesis of Compound Corresponding to Compound X

In a polymerization vessel, 17 parts by weight of vinyl acetate, 14 parts by weight of methanol, 0.023 part by weight of dimethyl maleate, 0.257 part by weight of itaconic acid, and 0.17 part by weight of azoisobutyronitrile were placed. After the inside of the polymerization vessel was replaced with nitrogen, the contents in the polymerization vessel were heated to boiling.

Moreover, a liquid mixture of 6 parts by weight of vinyl acetate, 5 parts by weight of methanol, and 0.207 part by weight of dimethyl maleate was prepared. To the inside of the polymerization vessel, the liquid mixture was continuously added until the polymerization rate reached 75% to perform polymerization, and the polymerization was stopped when the polymerization rate reached 90%. Then, unpolymerized vinyl acetate was removed by a routine procedure to obtain a polymer. The obtained polymer was saponified by a routine procedure with sodium hydroxide. Then, the saponified product was subjected to hot air drying at 90° C. for 90 minutes to obtain a compound which has a number average molecular weight of 11000 and a saponification degree of 88.0% by mole and corresponds to Compound X.

The absorbance at a wavelength of 270 nm of an aqueous solution containing 0.2% by weight of the obtained compound corresponding to Compound X and 99.8% by weight of water was determined to be 1.0. Here, the number average molecular weight of the obtained compound corresponding to Compound X was measured at 40° C. with GPC using an aqueous solution of a sample concentration of 0.2 w/v %.

(2) Synthesis of Modified Polyvinyl Acetate

A glass-made polymerization vessel equipped with a reflux condenser, a dropping funnel, a thermometer and a nitrogen inlet was prepared. In this polymerization vessel, 270 parts by weight of ion-exchanged water and 0.1 part by weight of the obtained compound corresponding to Compound X were placed, and the contents were heated and stirred to dissolve the compound corresponding to Compound X.

Next, the temperature inside the polymerization vessel was set to 58° C., 0.08 part by weight of lauroyl peroxide as a polymerization initiator, 100 parts by weight of a vinyl acetate monomer, 20 parts by weight of a vinyl ester of neodecanoic acid, and 0.3 part by weight of monooctyl maleate were added and allowed to undergo polymerization for 6 hours to obtain particles of a modified polyvinyl acetate.

Synthesis Examples 10 to 15

A modified polyvinyl acetate was obtained in the same manner as that in Synthesis Example 9 except that, at the time of obtaining the modified polyvinyl acetate, the kind of a compound used, the amount of vinyl acetate used, the kind of a monomer having a carboxyl group, and the amount of a monomer having a carboxyl group used each were set to those listed in the following Table 2.

(Evaluation of Modified Polyvinyl Acetate)

(1) Polymerization Degree of Modified Polyvinyl Acetate

The modified polyvinyl acetate obtained was measured for the polymerization degree in accordance with JIS K6725 "Testing method for polyvinyl acetate."

(2) Amount of Remaining Vinyl Acetate Monomers (Amount of Unreacted Monomers)

The amount of the remaining vinyl acetate monomers (amount of unreacted monomers) was measured according to the purity test for "vinyl acetate resin" in Japanese Standards of Food Additives, 7th Edition.

(3) Median Diameter of Modified Polyvinyl Acetate

By using a laser diffraction type particle size distribution measuring apparatus ("SALD-2000" available from SHIMADZU CORPORATION) and adding distilled water to a cell for measurement, the modified polyvinyl acetate obtained was measured for the particle size distribution to obtain a median diameter.

(4) Uniformity of Particle Diameter of Modified Polyvinyl Acetate

By using a laser diffraction type particle size distribution measuring apparatus ("SALD-2000" available from SHIMADZU CORPORATION) and adding distilled water to a cell for measurement, the modified polyvinyl acetate obtained was measured for the particle size distribution. The uniformity of the particle diameter of the modified polyvinyl acetate was evaluated on the basis of the CV value (the standard deviation of the particle size distribution/the volume average particle diameter (D50)×100). The smaller the CV value is, the more the uniformity of the particle diameter is enhanced. The uniformity of the particle diameter of the modified polyvinyl acetate was evaluated according to the following criteria.

[Criteria for Judgment of Uniformity of Particle Diameter of Modified Polyvinyl Acetate]

○: The CV value is less than or equal to 0.5%.

Δ: The CV value is greater than 0.5% and less than or equal to 0.8%.

x: The CV value is greater than 0.8%.

(5) Alkali resistance of modified polyvinyl acetate

In 97 g of acetone, 3 g of the modified polyvinyl acetate obtained was dissolved, and the solution was cast on a fluororesin film. The dissolved solution on the fluororesin film was dried for 3 days under the condition of room temperature of 23±2° C. and a humidity of 50±5% RH to obtain a film of the modified polyvinyl acetate (100 μm in thickness). The film of the modified polyvinyl acetate obtained was immersed in an aqueous 5% by weight sodium hydroxide solution at 70° C. for 24 hours. The alkali resistance of the modified polyvinyl acetate was evaluated according to the following criteria.

[Criteria for Judgment of Alkali Resistance of Modified Polyvinyl Acetate]

○○: There is no change in the film between before and after the immersion.

○: The surface of the film is slightly whitened and becomes turbid after the immersion.

Δ: White turbidity is observed on the film after the immersion.

x: There is an abnormality other than white turbidity on the film after the immersion.

The details and the evaluation results of the modified polyvinyl acetate obtained are shown in the following Tables 1 and 2. In the following Tables 1 and 2, a modified polyvinyl acetate in the case where "150 or less" is written in the column of (2) Amount of unreacted monomers has a smaller amount of unreacted monomers than that in the case where "300 or less" is written therein. In the following Table 1, the amount of vinyl acetate used (mol %) and the amount of fatty acid vinyl ester used (mol %) refer to respective amounts of vinyl acetate and a fatty acid vinyl ester used in the (co)polymerization in 100% by mole of the total thereof. The proportion of vinyl acetate structural unit (mol %) and the proportion of fatty acid vinyl ester structural unit (mol %) refer to respective proportions of a vinyl acetate structural unit and a fatty acid vinyl ester structural unit in the obtained modified polyvinyl acetate in 100% by mole of the total thereof. In the following Table 2, the amount of vinyl acetate used (mol %), the amount of fatty acid vinyl ester used (mol %) and the amount of monomer having carboxyl group used (mol %) refer to respective amounts of vinyl acetate, a fatty acid vinyl ester and a monomer having a carboxyl group used in the (co) polymerization in 100% by mole of the total thereof. The proportion of vinyl acetate structural unit (mol %) the proportion of fatty acid vinyl ester structural unit (mol %) and the proportion of structural unit derived from monomer having carboxyl group (mol %) refer to respective proportions of a vinyl acetate structural unit, a fatty acid vinyl ester structural unit and a structural unit derived from a monomer having a carboxyl group in the obtained modified polyvinyl acetate in 100% by mole of the total thereof.

TABLE 1

| | | Synthesis Ex. 1 | Synthesis Ex. 2 | Synthesis Ex. 3 | Synthesis Ex. 4 | Synthesis Ex. 5 | Synthesis Ex. 6 | Synthesis Ex. 7 | Synthesis Ex. 8 |
|---|---|---|---|---|---|---|---|---|---|
| Kind of compound corresponding to Compound X | | Dimethyl maleate-modified | Dimethyl maleate-modified | Dimethyl maleate-modified | Dimethyl maleate-modified | Dimethyl maleate-modified | Dimethyl maleate-modified | Dimethyl maleate-modified | Dimethyl maleate-modified |
| Production of modified polyvinyl acetate | Amount of vinyl acetate used (mol %) | 80 | 70 | 90 | 50 | 99 | 80 | 80 | 80 |
| | Proportion of vinyl acetate structural unit (mol %) | 80 | 70 | 90 | 50 | 99 | 80 | 80 | 80 |
| | Kind of fatty acid vinyl ester | Vinyl neodecanoate | Vinyl neodecanoate | Vinyl neodecanoate | Vinyl neodecanoate | Vinyl neodecanoate | Vinyl neodecanoate | Vinyl neodecanoate | Vinyl caprate |
| | Number of carbon atoms of fatty acid vinyl ester | 12 | 12 | 12 | 12 | 12 | 12 | 12 | 10 |
| | Amount of fatty acid vinyl ester used (mol %) | 20 | 30 | 10 | 50 | 1 | 20 | 20 | 20 |
| | Proportion of fatty acid vinyl ester structural unit (mol %) | 20 | 30 | 10 | 50 | 1 | 20 | 20 | 20 |
| Evaluation of modified polyvinyl acetate | (1) Polymerization degree | 5000 | 4000 | 4000 | 4000 | 4000 | 1000 | 9000 | 5000 |
| | (2) Amount of unreacted monomers | 150 or less | 150 or less | 300 or less | 300 or less | 300 or less | 300 or less | 300 or less | 300 or less |
| | (3) Median diameter (μm) | 300 | 250 | 350 | 400 | 300 | 350 | 300 | 300 |
| | (4) Uniformity of particle diameter | ○ | ○ | ○ | ○ | ○ | ○ | ○ | ○ |
| | (5) Alkali resistance | ○○ | ○○ | ○○ | ○ | ○ | ○ | ○○ | ○ |

TABLE 2

|  |  | Synthesis Ex. 9 | Synthesis Ex. 10 | Synthesis Ex. 11 | Synthesis Ex. 12 | Synthesis Ex. 13 | Synthesis Ex. 14 | Synthesis Ex. 15 |
|---|---|---|---|---|---|---|---|---|
|  | Kind of compound corresponding to Compound X | Dimethyl maleate-modified | Dimethyl maleate-modified | Dimethyl maleate-modified | Dimethyl maleate-modified | Dimethyl maleate-modified | Dimethyl maleate-modified | Dimethyl maleate-modified |
| Production of modified polyvinyl acetate | Amount of vinyl acetate used (mol %) | 89.7 | 89.7 | 89.7 | 89.7 | 89.7 | 89.7 | 89.7 |
|  | Proportion of vinyl acetate structural unit (mol %) | 89.7 | 89.7 | 89.7 | 89.7 | 89.7 | 89.7 | 89.7 |
|  | Kind of fatty acid vinyl ester | Vinyl neodecanoate | Vinyl neodecanoate | Vinyl neodecanoate | Vinyl neodecanoate | Vinyl neodecanoate | Vinyl neodecanoate | Vinyl neodecanoate |
|  | Number of carbon atoms of fatty acid vinyl ester | 12 | 12 | 12 | 12 | 12 | 12 | 12 |
|  | Amount of fatty acid vinyl ester used (mol %) | 10 | 10 | 10 | 10 | 10 | 10 | 10 |
|  | Proportion of fatty acid vinyl ester structural unit (mol %) | 10 | 10 | 10 | 10 | 10 | 10 | 10 |
|  | Kind of monomer having carboxyl group | Monooctyl maleate | Monobutyl fumarate | Monobutyl itaconate | Acrylic acid | Methacrylic acid | Maleic acid | Crotonic acid |
|  | Amount of monomer having carboxyl group used (mol %) | 0.3 | 0.3 | 0.3 | 0.3 | 0.3 | 0.3 | 0.3 |
|  | Proportion of structural unit derived from monomer having carboxyl group (mol %) | 0.3 | 0.3 | 0.3 | 0.3 | 0.3 | 0.3 | 0.3 |
| Evaluation of modified polyvinyl acetate | (1) Polymerization degree | 7000 | 7000 | 7000 | 7000 | 7000 | 7000 | 7000 |
|  | (2) Amount of unreacted monomers | 300 or less | 300 or less | 300 or less | 300 or less | 300 or less | 300 or less | 300 or less |
|  | (3) Median diameter (μm) | 350 | 360 | 350 | 350 | 350 | 350 | 350 |
|  | (4) Uniformity of particle diameter | ○ | ○ | ○ | ○ | ○ | ○ | ○ |
|  | (5) Alkali resistance | ○ | ○ | ○ | ○ | ○ | ○ | ○ |

In examples and a comparative example, polyvinyl butyral resins (a) and (b) were used. The butyralization degree (acetalization degree), the acetylation degree and the content ratio of hydroxyl groups of the polyvinyl butyral resins (a) and (b) were measured by a method in accordance with ASTM D1396-92. Even in the cases where these values were measured according to JIS K6728 "Testing methods for polyvinyl butyral," numerical values are the same as those obtained by a method in accordance with ASTM D1396-92 were exhibited.

Polyvinyl butyral resin (a) (PVB (a)): the acetylation degree of 12.8% by mole, the butyralization degree of 63.5% by mole, the content ratio of hydroxyl groups of 23.7% by mole, n-butyl aldehyde was used for the acetalization Polyvinyl butyral resin (b) (PVB (b)): the acetylation degree of 1% by mole, the butyralization degree of 68.5% by mole, the content ratio of hydroxyl groups of 30.5% by mole, n-butyl aldehyde was used for the acetalization Example 1

Using a mixing roll, 100 parts by weight of a modified polyvinyl acetate obtained in Synthesis Example 1 and 60 parts by weight of triethylene glycol di-2-ethylhexanoate (3GO) as a plasticizer were thoroughly kneaded to obtain a composition for an intermediate layer.

Then, 100 parts by weight of a polyvinyl butyral resin (b) and 35 parts by weight of triethylene glycol di-2-ethylhexanoate (3GO) as a plasticizer were thoroughly kneaded to obtain a composition for a protective layer.

The obtained composition for an intermediate layer and the composition for a protective layer were molded using a coextruder to prepare an interlayer film (0.8 mm in thickness) having a layered structure of a protective layer B (0.35 mm in thickness)/an intermediate layer A (0.1 mm in thickness)/a protective layer B (0.35 mm in thickness).

The obtained multilayer interlayer film was cut into a size of 30 mm in longitudinal length by 320 mm in transversal length. Next, the multilayer interlayer film was sandwiched between two sheets of transparent float glass (25 mm in longitudinal length by 305 mm in transversal length by 2.0 mm in thickness), and held in place at 90° C. for 30 minutes and pressed under vacuum with a vacuum laminator to obtain a laminate. With regard to the laminate, interlayer film portions protruded from the sheet of glass were cut away to obtain a sheet of laminated glass.

Examples 2 to 8

An interlayer film and a sheet of laminated glass were obtained in the same manner as that in Example 1 except that the kind of a modified polyvinyl acetate used for the intermediate layer A and the content of a plasticizer used for the protective layer B were set to those listed in the following Table 3.

Comparative Example 1

An interlayer film and a sheet of laminated glass were obtained in the same manner as that in Example 1 except that the kind and the content of a polyvinyl butyral resin used for each of the intermediate layer A and the protective layer B, and the kind and the content of a plasticizer were set to those listed in the following Table 3.

Example 9

Using a mixing roll, 100 parts by weight of a modified polyvinyl acetate obtained in Synthesis Example 9 and 40 parts by weight of triethylene glycol di-2-ethylhexanoate (3GO) as a plasticizer were thoroughly kneaded to obtain a composition for an intermediate layer.

Then, 100 parts by weight of a polyvinyl butyral resin (b) and 37.5 parts by weight of triethylene glycol di-2-ethylhexanoate (3GO) as a plasticizer were thoroughly kneaded to obtain a composition for a protective layer.

The obtained composition for an intermediate layer and the composition for a protective layer were molded using a coextruder to prepare a multilayer interlayer film (0.8 mm in thickness) having a layered structure of a protective layer B (0.35 mm in thickness)/an intermediate layer A (0.1 mm in thickness)/a protective layer B (0.35 mm in thickness).

The obtained multilayer interlayer film was cut into a size of 30 mm in longitudinal length by 320 mm in transversal length. Next, the multilayer interlayer film was sandwiched between two sheets of transparent float glass (25 mm in longitudinal length by 305 mm in transversal length by 2.0 mm in thickness), and held in place at 90° C. for 30 minutes and pressed under vacuum with a vacuum laminator to obtain a laminate. With regard to the laminate, interlayer film portions protruded from the sheet of glass were cut away to obtain a sheet of laminated glass.

Examples 10 to 15

An interlayer film and a sheet of laminated glass were obtained in the same manner as that in Example 1 except that the kind of each of a modified polyvinyl acetate used for the intermediate layer A and a polyvinyl butyral resin used for the protective layer B were set to those shown in the following Table 4.

(Evaluation)
(1) Peak Temperature of tan δ at Low Temperature Side, Maximum Peak Value of tan δ at Low Temperature Side, and Maximum Peak Value of tan δ at High Temperature Side The obtained interlayer film was stored for 1 month under the condition of 23° C., after which the interlayer film was cut out into a circular shape with a diameter of 8 mm. Then, by performing a temperature dispersion measurement of the dynamic viscoelasticity at a temperature rise rate of 5° C./minute under the conditions of a strain of 1.0% and a frequency of 1 Hz by a shearing method using a viscoelasticity measuring apparatus ("ARES" available from Rheometric Scientific, Inc.), the peak temperature of tan δ observed at the lowest temperature side, the maximum value of tan δ at the peak temperature of tan δ observed at the lowest temperature side, and the maximum value of tan δ at the peak temperature of tan δ observed at the highest temperature side were measured.

(2) Loss Factor

The obtained sheet of laminated glass was stored for 1 month under the condition of 20° C. With regard to the sheet of laminated glass stored for 1 month under the condition of 20° C., using a measuring apparatus "SA-01" (available from RION Co., Ltd.), a loss factor was measured by a central exciting method under a condition of 20° C. A loss factor (20° C. loss factor) at a quaternary mode (about 3150 Hz) of a resonance frequency of the loss factor obtained was evaluated.

Moreover, with regard to the sheet of laminated glass stored for 1 month under the condition of 20° C., using a measuring apparatus "SA-01" (available from RION Co., Ltd.), a loss factor was measured by a central exciting method under a condition of 30° C. A loss factor (30° C. loss factor) at a senary mode (about 6300 Hz) of a resonance frequency of the loss factor obtained was evaluated.

(3) Adhesive Force

First, 100 parts by weight of a polyvinyl butyral resin (b) and 38 parts by weight of triethylene glycol di-2-ethylhexanoate (3GO) as a plasticizer were thoroughly kneaded to obtain a composition for a protective layer, and the composition was press-molded to obtain a protective layer sheet with a thickness of 800 μm.

Each of modified polyvinyl acetates obtained in Synthesis Examples 9 to 15 and 40 parts by weight of triethylene glycol di-2-ethylhexanoate (3GO) as a plasticizer were thoroughly kneaded to obtain a composition for an intermediate layer, and the composition was press-molded to obtain an intermediate layer sheet with a thickness of 800 μm.

The protective layer sheet and the intermediate layer sheet were cut into pieces with a width of 2.5 cm and laminated together, after which the layers were subjected to heat-sealing at 140° C. to obtain a laminated sheet. Using the obtained laminated sheet, a 180-degree peeling test was performed to measure the adhesive force (N). Although 38 parts by weight of a plasticizer was used for the respective protective layer sheets, even in the cases where 37.5 parts by weight of the plasticizer was used, a similar tendency was seen in the magnitude of the adhesive force.

The details and the evaluation results of the interlayer film obtained are shown in the following Tables 3 and 4.

TABLE 3

| | | | Ex. 1 | Ex. 2 | Ex. 3 | Ex. 4 | Ex. 5 | Ex. 6 | Ex. 7 | Ex. 8 | Comp. Ex. 1 |
|---|---|---|---|---|---|---|---|---|---|---|---|
| Intermediate layer A | Resin | Kind | Synthesis Ex. 1 | Synthesis Ex. 2 | Synthesis Ex. 3 | Synthesis Ex. 4 | Synthesis Ex. 5 | Synthesis Ex. 6 | Synthesis Ex. 7 | Synthesis Ex. 8 | PVB(a) |
| | | Content (parts by weight) | 100 | 100 | 100 | 100 | 100 | 100 | 100 | 100 | 100 |
| | Kind of plasticizer | | 3GO | 3GO | 3GO | 3GO | 3GO | 3GO | 3GO | 3GO | 3GO |
| | Content of plasticizer (parts by weight) | | 60 | 60 | 60 | 60 | 60 | 60 | 60 | 60 | 60 |
| Protective layer B | Resin | Kind | PVB(b) | PVB(b) | PVB(b) | PVB(b) | PVB(b) | PVB(b) | PVB(b) | PVB(b) | PVB(b) |
| | | Butyralization degree (mol %) | 68.5 | 68.5 | 68.5 | 68.5 | 68.5 | 68.5 | 68.5 | 68.5 | 68.5 |
| | | Acetylation degree (mol %) | 1 | 1 | 1 | 1 | 1 | 1 | 1 | 1 | 1 |
| | | Content (parts by weight) | 100 | 100 | 100 | 100 | 100 | 100 | 100 | 100 | 100 |
| | Kind of plasticizer | | 3GO | 3GO | 3GO | 3GO | 3GO | 3GO | 3GO | 3GO | 3GO |
| | Content of plasticizer (parts by weight) | | 35 | 36.5 | 33 | 34 | 38 | 40 | 40 | 37 | 38.5 |
| Film constitution | | | B/A/B | B/A/B | B/A/B | B/A/B | B/A/B | B/A/B | B/A/B | B/A/B | B/A/B |
| Peak temperature (° C.) of tan δ at low temperature side | | | −2.3 | −2.9 | −3.4 | −4.3 | −3.1 | −2.9 | −2.2 | −3.3 | −1.8 |
| Maximum peak value of tan δ at low temperature side | | | 1.81 | 1.77 | 1.89 | 1.86 | 1.81 | 1.74 | 1.77 | 1.79 | 1.05 |

TABLE 3-continued

|  | Ex. 1 | Ex. 2 | Ex. 3 | Ex. 4 | Ex. 5 | Ex. 6 | Ex.7 | Ex. 8 | Comp. Ex. 1 |
|---|---|---|---|---|---|---|---|---|---|
| Maximum peak value of tan δ at high temperature side | 0.5 | 0.53 | 0.44 | 0.47 | 0.51 | 0.54 | 0.52 | 0.5 | 0.54 |
| 20° C. Loss factor at about 3150 Hz | 0.56 | 0.54 | 0.6 | 0.59 | 0.57 | 0.55 | 0.55 | 0.56 | 0.28 |
| 30° C. Loss factor at about 6300 Hz | 0.17 | 0.15 | 0.18 | 0.2 | 0.16 | 0.16 | 0.17 | 0.17 | 0.09 |

TABLE 4

|  |  |  | Ex. 9 | Ex. 10 | Ex. 11 | Ex. 12 | Ex. 13 | Ex. 14 | Ex. 15 |
|---|---|---|---|---|---|---|---|---|---|
| Intermediate layer A | Resin | Kind | Synthesis Ex. 9 | Synthesis Ex. 10 | Synthesis Ex. 11 | Synthesis Ex. 12 | Synthesis Ex. 13 | Synthesis Ex. 14 | Synthesis Ex. 15 |
|  |  | Content (parts by weight) | 100 | 100 | 100 | 100 | 100 | 100 | 100 |
|  |  | Kind of plasticizer | 3GO | 3GO | 3GO | 3GO | 3GO | 3GO | 3GO |
|  |  | Content of plasticizer (parts by weight) | 40 | 40 | 40 | 40 | 40 | 40 | 40 |
| Protective layer B | Resin | Kind | PVB(b) | PVB(b) | PVB(b) | PVB(b) | PVB(b) | PVB(b) | PVB(b) |
|  |  | Butyralization degree (mol %) | 68.5 | 68.5 | 68.5 | 68.5 | 68.5 | 68.5 | 68.5 |
|  |  | Acetylation degree (mol %) | 1 | 1 | 1 | 1 | 1 | 1 | 1 |
|  |  | Content (parts by weight) | 100 | 100 | 100 | 100 | 100 | 100 | 100 |
|  |  | Kind of plasticizer | 3GO | 3GO | 3GO | 3GO | 3GO | 3GO | 3GO |
|  |  | Content of plasticizer (parts by weight) | 37.5 | 37.5 | 37.5 | 37.5 | 37.5 | 37.5 | 37.5 |
| Film constitution |  |  | B/A/B | B/A/B | B/A/B | B/A/B | B/A/B | B/A/B | B/A/B |
| Peak temperature (° C.) of tan δ at low temperature side |  |  | −3.8 | −2.6 | −3.3 | −4.1 | −2.4 | −1.8 | −2.2 |
| Maximum peak value of tan δ at low temperature side |  |  | 1.73 | 1.75 | 1.72 | 1.81 | 1.78 | 1.77 | 1.74 |
| Maximum peak value of tan δ at high temperature side |  |  | 0.5 | 0.5 | 0.46 | 0.47 | 0.49 | 0.51 | 0.5 |
| 20° C. Loss factor at about 3150 Hz |  |  | 0.55 | 0.55 | 0.54 | 0.56 | 0.55 | 0.55 | 0.54 |
| 30° C. Loss factor at about 6300 Hz |  |  | 0.17 | 0.16 | 0.16 | 0.18 | 0.16 | 0.16 | 0.16 |
| Adhesive force (N) |  |  | 12.1 | 10.12 | 17.35 | 13.45 | 14.21 | 15.12 | 14.56 |

EXPLANATION OF SYMBOLS

1: Interlayer film
1a: First surface
1b: Second surface
2: First layer
2a: First surface
2b: Second surface
3: Second layer
3a: Outer surface
4: Third layer
4a: Outer surface
11: Laminated glass
16: Laminated glass
21: First laminated glass constituent member
22: Second laminated glass constituent member
31: Interlayer film
31a: First surface
31b: Second surface

The invention claimed is:

1. An interlayer film for laminated glass, comprising a modified polyvinyl acetate and a plasticizer; and the modified polyvinyl acetate having a vinyl acetate structural unit and a fatty acid vinyl ester structural unit,
the modified polyvinyl acetate having the vinyl acetate structural unit, the fatty acid vinyl ester structural unit and a structural unit derived from a monomer having a carboxyl group,
the modified polyvinyl acetate containing the vinyl acetate structural unit in a content greater than or equal to 45% by mole and less than or equal to 98.99% by mole, the fatty acid vinyl ester structural unit in a content greater than or equal to 1% by mole and less than or equal to 50% by mole, and the structural unit derived from a monomer having a carboxyl group in a content greater than or equal to 0.01% by mole and less than or equal to 5% by mole, in 100% by mole of the total of the vinyl acetate structural unit, the fatty acid vinyl ester structural unit and the structural unit derived from a monomer having a carboxyl group.

2. The interlayer film for laminated glass according to claim 1,
wherein the fatty acid vinyl ester structural unit is a structural unit derived from a fatty acid vinyl ester and introduced by the fatty acid vinyl ester, and the fatty acid vinyl ester is vinyl caprylate, vinyl caprate, vinyl laurate, vinyl myristate, vinyl palmitate, vinyl stearate, vinyl cinnamate or vinyl neodecanoate.

3. The interlayer film for laminated glass according to claim 1,
wherein the monomer having a carboxyl group is (meth) acrylic acid, maleic acid, fumaric acid, crotonic acid, Taconic acid, a monoester of maleic acid, a monoester of fumaric acid or a monoester of itaconic acid.

4. The interlayer film for laminated glass according to claim 1,
wherein the modified polyvinyl acetate contains the vinyl acetate structural unit in a content greater than or equal to 50% by mole in 100% by mole of the total of the vinyl acetate structural unit and the fatty acid vinyl ester structural unit.

5. The interlayer film for laminated glass according to claim 1,
wherein the polymerization degree of the modified polyvinyl acetate is greater than or equal to 1000 and less than or equal to 9000.

6. The interlayer film for laminated glass according to claim 1, being an interlayer film for laminated glass having a one-layer structure provided with only a first layer or a two or more-layered structure provided with the first layer and other layer(s),
wherein the first layer includes the modified polyvinyl acetate and the plasticizer.

7. The interlayer film for laminated glass according to claim 1,
wherein the fatty acid vinyl ester structural unit is a structural unit derived from a fatty acid vinyl ester and introduced by the fatty acid vinyl ester, and the number of carbon atoms of the fatty acid vinyl ester is less than or equal to 20.

8. The interlayer film for laminated glass according to claim 7,
wherein the number of carbon atoms of the fatty acid vinyl ester is greater than or equal to 5 and less than or equal to 20.

9. The interlayer film for laminated glass according to claim 1,
wherein the modified polyvinyl acetate is obtained by allowing vinyl acetate and a fatty acid vinyl ester to undergo copolymerization in the presence of a compound having a structural unit represented by the following formula (X):

[Chemical 1]

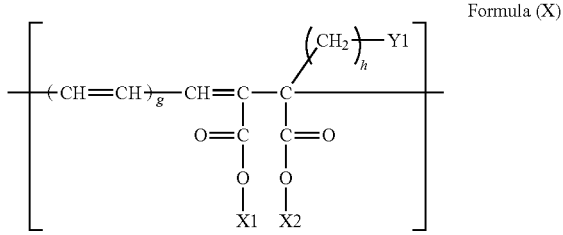

Formula (X)

wherein X1 and X2 each represent an alkyl group with 1 to 12 carbon atoms, a hydrogen atom or a metal salt, Y1 represents a carboxylic acid group, a carboxylic acid ester group, a carboxylic acid metal salt or a hydrogen atom, g represents an integer of 0 to 3, and h represents an integer of 0 to 12.

10. The interlayer film for laminated glass according to claim 9,
wherein the modified polyvinyl acetate is obtained by allowing the vinyl acetate and the fatty acid vinyl ester to undergo copolymerization in the presence of a compound having a structural unit represented by the formula (X).

11. The interlayer film for laminated glass according to claim 9,
wherein the modified polyvinyl acetate has the vinyl acetate structural unit, the fatty acid vinyl ester structural unit and a structural unit derived from a monomer having a carboxyl group, and
the modified polyvinyl acetate is obtained by allowing the vinyl acetate, the fatty acid vinyl ester, and the monomer having a carboxyl group to undergo copolymerization in the presence of a compound having a structural unit represented by the formula (X).

12. The interlayer film for laminated glass according to claim 1, being provided with a first layer and a second layer layered on a first surface of the first layer,
wherein the first layer includes the modified polyvinyl acetate and the plasticizer.

13. The interlayer film for laminated glass according to claim 12,
wherein the second layer includes a polyvinyl acetal resin, and
the acetylation degree of the polyvinyl acetal resin in the second layer is less than or equal to 15% by mole and the content ratio of hydroxyl groups therein is greater than or equal to 20% by mole.

14. The interlayer film for laminated glass according to claim 12, being further provided with a third layer layered on a second surface opposite to the first surface of the first layer.

15. The interlayer film for laminated glass according to claim 14,
wherein the third layer includes a polyvinyl acetal resin, and
the acetylation degree of the polyvinyl acetal resin in the third layer is less than or equal to 15% by mole and the content ratio of hydroxyl groups therein is greater than or equal to 20% by mole.

16. Laminated glass, comprising:
a first laminated glass constituent member,
a second laminated glass constituent member, and
the interlayer film for laminated glass according to claim 1; and the interlayer film for laminated glass being sandwiched between the first and second laminated glass constituent members.

17. An interlayer film for laminated glass, being provided with a first layer, a second layer layered on a first surface of the first layer and a third layer layered on a second surface opposite to the first surface of the first layer,
the first layer including a modified polyvinyl acetate and a plasticizer,
the content of the plasticizer in the first layer being greater than or equal to 25 parts by weight relative to 100 parts by weight of the modified polyvinyl acetate in the first layer,
the modified polyvinyl acetate having a vinyl acetate structural unit and a fatty acid vinyl ester structural unit.

18. An interlayer film for laminated glass according to claim 17,
wherein the second layer includes a thermoplastic resin and a plasticizer, and the third layer includes a thermoplastic resin and a plasticizer.

19. Laminated glass, comprising:
a first laminated glass constituent member,
a second laminated glass constituent member, and
the interlayer film for laminated glass according to claim 17; and the interlayer file for laminated glass being sandwiched between the first and second laminated glass constituent members.

* * * * *